(12) United States Patent
Saito

(10) Patent No.: US 11,182,115 B2
(45) Date of Patent: Nov. 23, 2021

(54) CLIENT TERMINAL, INFORMATION PROCESSING SYSTEM, AND GROUP CHANGE METHOD

(71) Applicant: Satoshi Saito, Saitama (JP)

(72) Inventor: Satoshi Saito, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/909,164

(22) Filed: Jun. 23, 2020

(65) Prior Publication Data

US 2021/0026581 A1    Jan. 28, 2021

(30) Foreign Application Priority Data

Jul. 24, 2019 (JP) .............................. JP2019-136374

(51) Int. Cl.
*G06F 7/08* (2006.01)
*G06F 3/12* (2006.01)
*H04N 1/00* (2006.01)

(52) U.S. Cl.
CPC .......... *G06F 3/1232* (2013.01); *G06F 3/1203* (2013.01); *G06F 3/1231* (2013.01); *H04N 1/00511* (2013.01)

(58) Field of Classification Search
CPC ........ G06F 3/1231; G06F 3/1232; G06F 7/08; H04N 1/00511
USPC .................. 358/1.15, 1.6; 709/224, 223, 249
See application file for complete search history.

(56) References Cited

U.S. PATENT DOCUMENTS

| | | | |
|---|---|---|---|
| 2007/0260716 A1* | 11/2007 | Gnanasambandam | ...................... G06Q 10/06 709/223 |
| 2007/0282995 A1* | 12/2007 | Mizuno | .................. G06F 3/1239 709/223 |
| 2012/0221954 A1* | 8/2012 | Tanaka | .................. G06F 16/248 715/736 |
| 2018/0089217 A1 | 3/2018 | Nagamori et al. | |

FOREIGN PATENT DOCUMENTS

JP        2018-055497          4/2018

* cited by examiner

*Primary Examiner* — Jamares Q Washington
(74) *Attorney, Agent, or Firm* — IPUSA, PLLC

(57) ABSTRACT

A client terminal, an information processing system, and a group change method. The client terminal receives screen data from one or more information processing apparatuses, displays on a display in a selectable manner based on the received screen data one or more output devices each belonging to a particular group in an old organization, and one or more groups in a new organization as a candidate for transfer destination of the one or more output devices, receives selection of the one or more output devices belonging to the particular group in the old organization and selection of the one or more groups in the new organization, creates association information that associates the selected output device with the selected group in the new organization, and transmits the association information to the one or more information processing apparatuses.

9 Claims, 23 Drawing Sheets

FIG. 8

| DEVICE ID | MAC ADDRESS | DAILY DATA ID | ... |
|---|---|---|---|

FIG. 9

| DAILY DATA ID | DATE | COUNTER | | | | |
|---|---|---|---|---|---|---|
| | | TOTAL | BY FUNCTION | ... | BY COLOR | ... | BY PAPER SIZE | ... |

FIG. 10

| GROUP ID | GROUP NAME | ADDRESS | TELEPHONE NUMBER | MAIL ADDRESS | MONTHLY DATA CALCULATION DATE | ... |
|---|---|---|---|---|---|---|

FIG.11A

| DEVICE ID | GROUP ID | MAC ADDRESS | DAILY DATA ID | MONTHLY DATA ID | ... |
|---|---|---|---|---|---|

FIG. 11B

| DEVICE ID | UPDATE DATE | GROUP ID | ... |
|---|---|---|---|

FIG. 11C

| MONTHLY DATA ID | MONTH AND YEAR | COUNTER | | | | |
|---|---|---|---|---|---|---|
| | | TOTAL | BY FUNCTION | ... | BY COLOR | ... | BY PAPER SIZE | ... |

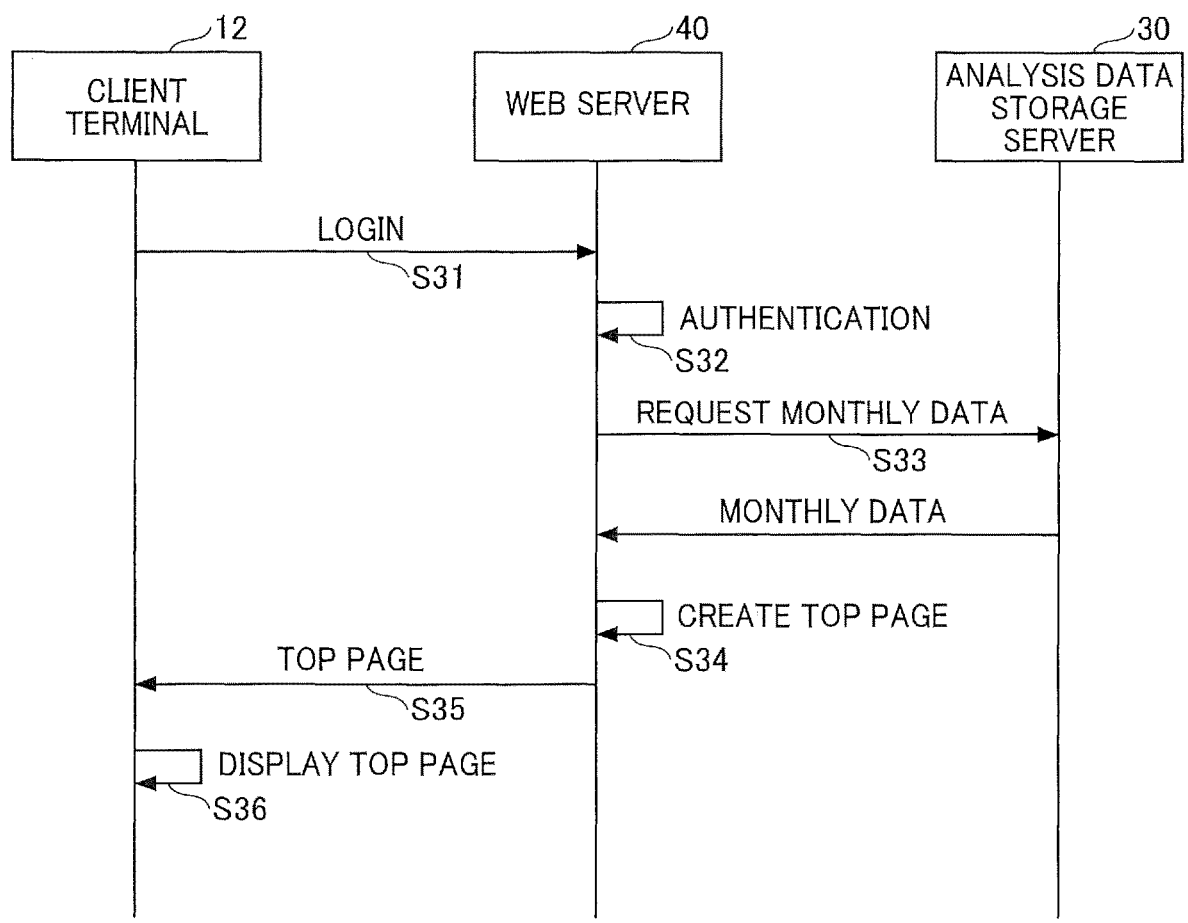

FIG. 23

| REQUIRED SPECIFICATION | | | | | |
| --- | --- | --- | --- | --- | --- |
| NEW ORGANIZATION | NUMBER OF UNITS | DEVICE TYPE | PRINT SPEED | SCANNER | FACSIMILE |
| D1 DEVELOPMENT GROUP | 1 | COLOR | 25 PAGES PER MINUTE OR MORE | YES | NO |
| D1 DEVELOPMENT GROUP | 1 | MONOCHROME | 50 PAGES PER MINUTE OR MORE | YES | NO |
| D1 DEVELOPMENT GROUP | 1 | MONOCHROME | 30 PAGES PER MINUTE OR MORE | YES | NO |

FIG. 24

| DEVICE SPECIFICATION | | | | | |
| --- | --- | --- | --- | --- | --- |
| OLD ORGANIZATION | DEVICE ID | DEVICE TYPE | PRINT SPEED | SCANNER | FACSIMILE |
| B1 DEVELOPMENT SECTION | D0001 | COLOR | 30 PAGES PER MINUTE | YES | NO |
| B1 DEVELOPMENT SECTION | D0002 | MONOCHROME | 60 PAGES PER MINUTE | YES | NO |
| B1 DEVELOPMENT SECTION | D0003 | MONOCHROME | 25 PAGES PER MINUTE | YES | NO |
| B1 DEVELOPMENT SECTION | D0004 | MONOCHROME | 25 PAGES PER MINUTE | YES | NO |

CLIENT TERMINAL, INFORMATION PROCESSING SYSTEM, AND GROUP CHANGE METHOD

CROSS-REFERENCE TO RELATED APPLICATIONS

This patent application is based on and claims priority pursuant to 35 U.S.C. § 119(a) to Japanese Patent Application No. 2019-136374, filed on Jul. 24, 2019, in the Japan Patent Office, the entire disclosure of which is hereby incorporated by reference herein.

BACKGROUND

Technical Field

The present disclosure relates to a client terminal, an information processing system, and a group change method.

Background Art

An output device such as an image forming apparatus has a function of counting the number of printed sheets. This counting function is used to determine timing of maintenance and to determine charge amount in a case of pay-per-use contract. The counting function may also be used within a company to manage usage of each individual.

The usage of such output device is generally managed for each output device, but when a company or a local government (hereinafter simply referred to as a company) uses a large number of output devices, there is a need to grasp the usage amount by a unit of organization (hereinafter referred to as a group) such as a department in a company.

SUMMARY

Embodiments of the present disclosure describes a client terminal, an information processing system, and a group change method. The client terminal receives screen data from one or more information processing apparatuses, displays on a display in a selectable manner based on the received screen data one or more output devices each belonging to a particular group in an old organization, and one or more groups in a new organization as a candidate for transfer destination of the one or more output devices, receives selection of the one or more output devices belonging to the particular group in the old organization and selection of the one or more groups in the new organization, creates association information that associates the selected output device with the selected group in the new organization, and transmits the association information to the one or more information processing apparatuses.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 8 is a diagram illustrating an example of counter settings;

FIG. 9 is a diagram illustrating an example of daily data;

FIG. 10 is a diagram illustrating an example of group data;

FIG. 11A is a diagram illustrating an example of device data, FIG. 11B is a diagram illustrating an example of device history data, and FIG. 11C is a diagram illustrating an example of monthly data;

FIG. 20 is a sequence diagram illustrating an example of a web page display process;

FIG. 23 is a schematic diagram illustrating required specification information stored in a required specification storage unit according to an embodiment;

FIG. 24 is a schematic diagram illustrating device specification information stored in a device specification storage unit according to an embodiment;

Figure 1:
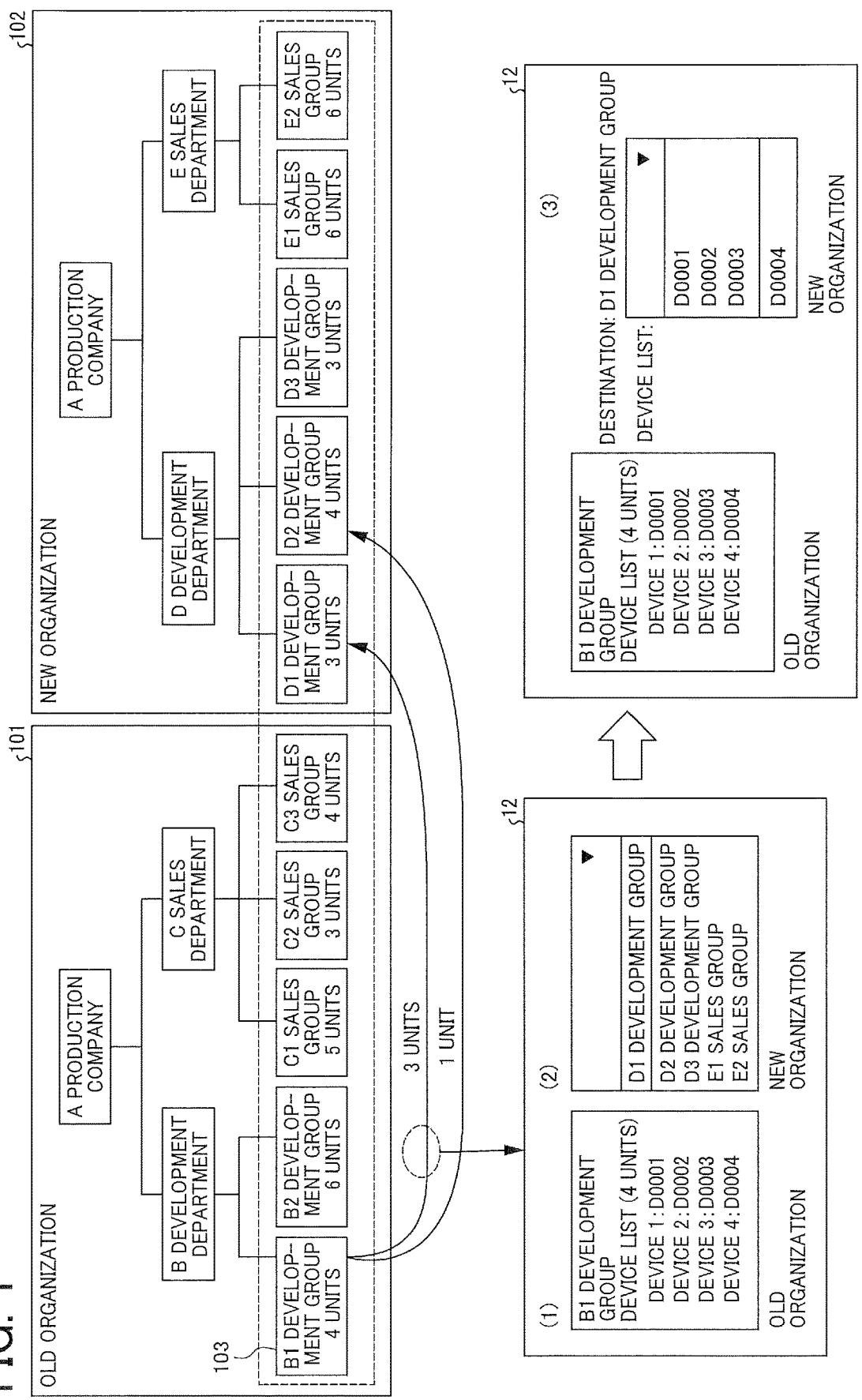
FIG. 1 is a diagram illustrating a method of changing a group to which an output device belongs in an information processing system, according to embodiments.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result. As used herein, the singular forms "a", "an", and "the" are intended to include the plural forms as well, unless the context clearly indicates otherwise.

Hereinafter, a description is given of embodiments of an information processing system and a group change method performed by the information processing system with reference to the drawings.

The outline of the operation performed by a user, for changing the group to which the output device belongs when the organization is changed is described with reference to FIG. 1. Note that the user is a person who manages usage amount of an individual or a group in a company as a customer using the information processing system. Such user may be called an administrator.

FIG. 1 is a diagram illustrating a method of changing a group to which an output device belongs in an information processing system according to the first embodiment. In FIG. 1, an old organization chart 101 and a new organization chart 102 are illustrated. Each organization unit 103 at the bottom of the organization chart (leaf portion of the tree structure) is called a group. The number of output devices already belonging to each group in the old organization chart 101 is indicated. For example, four units belong to B1 development group, six units belong to B2 development group, and so on. Further, in the new organization chart 102, the number of output devices required to be assigned to each group is indicated. For example, three units are required in D1 development group, four units are required in D2 development group, and so on.

The user operates the client terminal 12 to communicate with a server described below and displays a web page for changing the group to which the output device belongs. On the web page, the user manually maps to which group in the new organization each output device of the old organization should belong. Mapping refers to, for example, allocation.

An example where four output devices of the B1 development group are assigned to a group in a new organization is described. As illustrated in (1) of FIG. 1, when the user selects the B1 development group in the old organization, a list of one or more output devices currently belonging to the B1 development group is displayed.

Next, as illustrated in (2) of FIG. 1, the user selects a transfer destination of each of the output devices of the B1 development group from one or more groups of the new organization. In FIG. 1, D1 development group is selected. The new organization chart 102 is downloaded to the server from an organization chart management system described below, and the server displays each group in the new organization.

When a transfer destination group is determined, as illustrated in (3) of FIG. 1, the client terminal 12 displays each of the four output devices of the transfer source B1 development group, and the user selects one or more output devices to be transferred to the transfer destination D1 development group. In FIG. 1, D0001, D0002, and D0003 are selected.

The user repeats such work until there are no output device left in the old organization chart 101. For example, the remaining output device (D0004) of the B1 development group is assigned to the D2 development group. Similarly, one or more output devices 10 that belong to the B2 development group, the C1 sales group, the C2 sales group, and the C3 sales group are respectively assigned to one or more groups in the new organization.

In response to assignment of output device by the user, the server automatically associates the output device with each group in the new organization based on the assignment. Further, with the association of each output device with the new organization, the association between the output device and the old organization is automatically released, and the device data described later that associates the output device with the group in the old organization is automatically deleted.

Therefore, in the present embodiment, out of three steps of work including: first step of creating a new organization to which the output device belongs based on the new organization chart 102; second step of releasing association between the output device and the old organization; and third step of assigning the output device to the new organization, only the third step needs to be performed, and the time and effort for the user to change the group to which the output device belongs is reduced. Further, as described with reference to FIG. 1 and FIGS. 13A to 15 which are described below, the user only needs to select the transfer destination group and the output device from the pull-down menu, and work load is reduced since operability increases as the user can visually select the operation.

In this disclosure, an organization is an organized group of multiple objects or people with a shared purpose. Examples of the organization include, but not limited to, a company organization, a group organization, a local government organization, and the like. Whether the organization is for profit or not does not matter.

In this disclosure, a group is a plurality of people that are put together either spatially, psychologically, or purposely. For example, groups are departments within a company or an organization.

In this disclosure, association information associates the output device and the group in the new organization with each other and defines allocation of the output device to the group.

Figure 2:
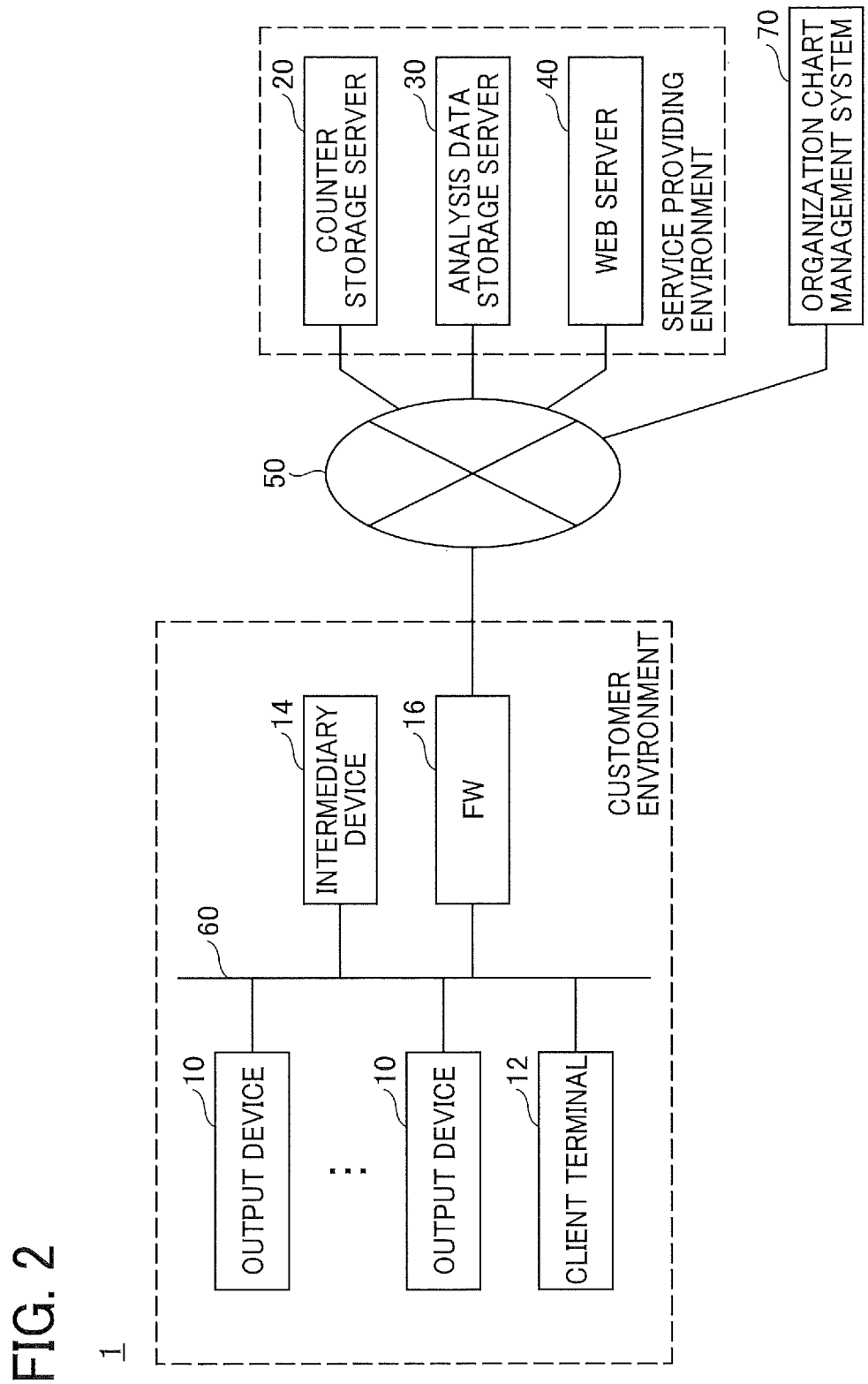
FIG. 2 is a block diagram illustrating an example of the information processing system.

FIG. 2 is a block diagram illustrating an example of a configuration of an information processing system 1. In the information processing system 1 of FIG. 2, a customer environment and a service providing environment are connected through a network 50 such as the internet. A customer is a customer of a service provided by the service providing environment, and includes an organization such as a company, a nonprofit organization, an educational institution, an administrative body or a department. One or more output devices 10, a client terminal 12, an intermediary device 14, and a firewall (FW) 16 are connected to the customer environment through a network 50 such as a local area network (LAN). A counter storage server 20, an analysis data storage server 30, and a web server 40 are connected to the network 50 in the service providing environment.

Examples of the output device 10 include an image forming apparatus such as a laser printer and a multifunction peripheral (multifunctional printer, referred to as MFP), a projector, an electronic whiteboard, a videoconference apparatus, a camera, industrial equipment having a communication capability, and medical equipment having a communication capability. The client terminal 12 is an information processing apparatus used by a user. Examples of the client terminal 12 include a smartphone, a mobile phone, a tablet personal computer (PC), a desktop PC, and a laptop computer.

In the client terminal 12, an application having a screen displaying function, such as a web browser, is installed. The application is not limited to the web browser as long as the application includes the function of displaying screen data received from the web server 40 on a display.

The intermediary device 14 is any device that intermediates communication, for example, a router. The intermediary device 14 collects usage information (counter data) indicating a usage record of the output device 10 from the output device 10 and collectively transmits the usage information to the counter storage server 20. Alternatively, the output device 10 may transmit the counter data to the counter storage server 20 directly without intervention of the intermediary device 14. The information processing system 1 may not include the intermediary device 14.

The counter storage server 20 stores the counter value of the output device 10 received from the customer environment in an online transaction processing (OLTP) table, as described below. For example, daily data of the counter value of the output device 10 is accumulated in the OLTP table.

The analysis data storage server 30 uses the OLTP table of the counter storage server 20 to create an OLAP cube described below. For example, in the OLAP cube, monthly data generated based on the monthly data calculation date from the daily data stored in the OLTP table is stored.

The analysis data storage server 30 creates the monthly data for each group in the organization chart. The analysis data storage server 30 acquires the association information from the web server 40 and changes the output device 10 belonging to each group in the new organization based on the association information.

The web server 40 acquires the daily data or monthly data for each group using the output device 10 from the OLTP table of the counter storage server 20 or the OLAP cube of the analysis data storage server 30. The web server 40 creates screen data of a web page for displaying the daily data and the monthly data on the client terminal 12 and transmits the screen data to the client terminal 12.

Also, the web server 40 acquires the organization chart from the organization chart management system 70, acquires the association information defining the allocation of the output device 10 to each group from the client terminal 12, and provides the acquired information to the analysis data storage server 30.

The screen data is generated by Hyper Text Markup Language (HTML), Extended Markup Language (XML), Cascade Style Sheet (CSS), and JavaScript (registered trademark), for example. The web page may be provided by a web application. The web application refers to software executed on a web browser, or a mechanism that implements such software. Specifically, the web application is implemented by a cooperation between a program written in a programming language such as JavaScript (registered trademark) that operates on the web browser and a program provided by a web server. The web page can be dynamically changed by the web application.

The organization chart management system 70 stores the organization chart of a company. The organization chart has, for example, the tree structure, and each node and leaf represents a department or the like. In the description of this embodiment, the output device 10 belongs to the leaf of the tree structure, but the output device 10 may belong to the node.

The configuration of the information processing system 1 illustrated in FIG. 2 is an example and one or more servers such as a proxy server or a gateway server may intervene between the customer environment and the counter storage server 20. Further, the client terminal 12 may be outside the customer environment and may be connected to the network 50, for example. The counter storage server 20, the analysis data storage server 30, and the web server 40 of FIG. 2 may be integrated into one information processing apparatus or may be distributed into a plurality of information processing apparatuses.

For example, some or all of the functions of the counter storage server 20 may be provided in the analysis data storage server 30, the web server 40, or another server. Some or all of the functions of the analysis data storage server 30 may be provided in the counter storage server 20, the web server 40, or another server. Further, some or all of the functions of the web server 40 may be provided in the counter storage server 20, the analysis data storage server 30, or another server.

As described above, in the information processing system 1 according to the present embodiment, the daily data of the output device 10 is collected in the counter storage server 20. The analysis data storage server 30 acquires daily data from the counter storage server 20 and creates monthly data for each group or output device 10. Then, the web server 40 creates the web page including monthly data for each group or output device 10 and displays the web page on the web browser installed in the client terminal 12.

In the information processing system 1 of FIG. 2, the counter storage server 20, the analysis data storage server 30, and the web server 40 are connected to the network 50 such as the internet outside the customer environment. In other words, the information processing system 1 of FIG. 2 is an example in which the counter storage server 20, the analysis data storage server 30, and the web server 40 are provided in a so-called cloud environment. The counter storage server 20, the analysis data storage server 30, the web server 40, and the organization chart management system 70 may be provided inside the customer environment (on-premises environment).

Figure 3:
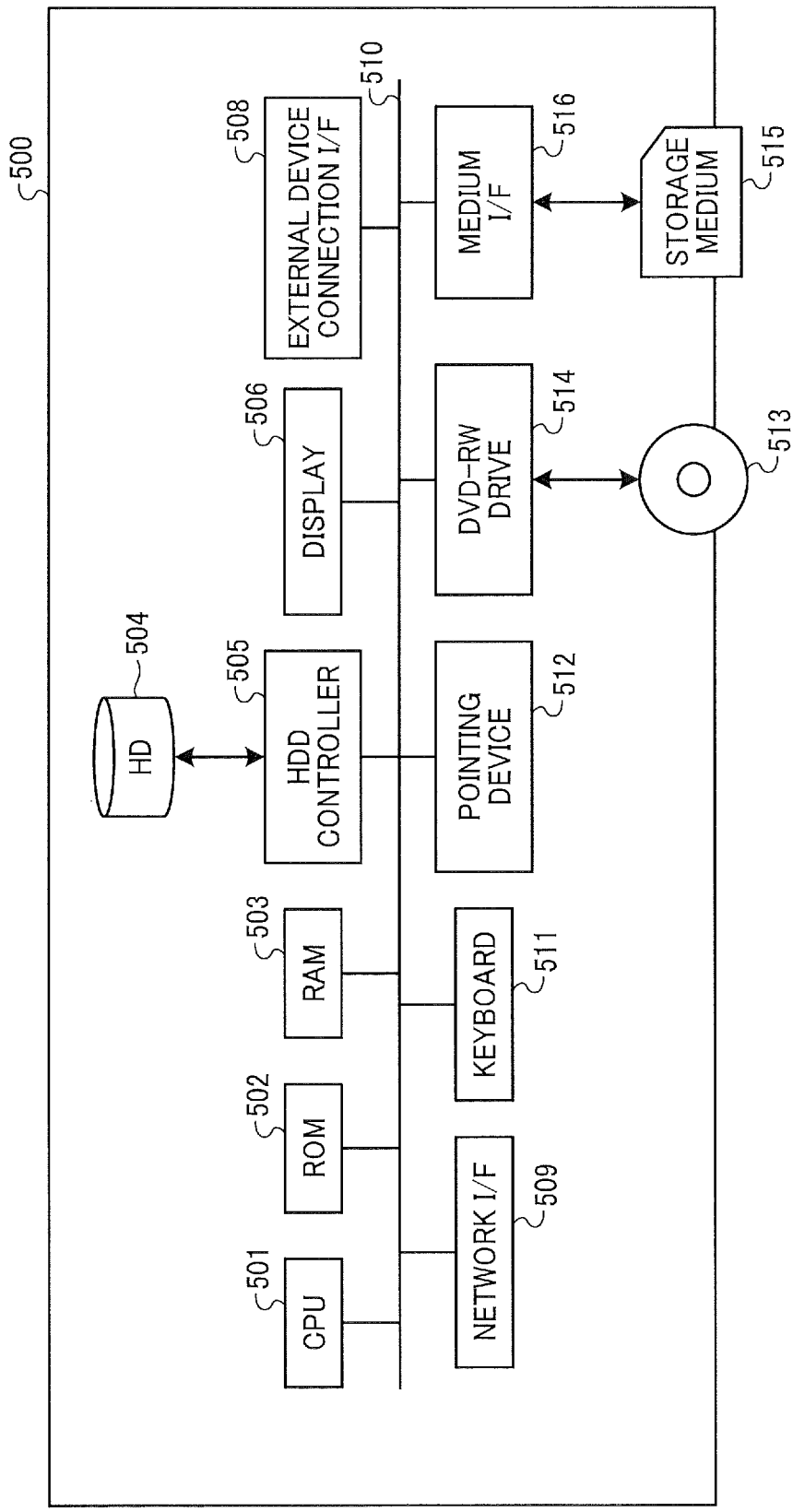
FIG. 3 is a block diagram illustrating a hardware configuration of an example of a computer.

The client terminal 12 illustrated in FIG. 2 is implemented by a computer having a hardware configuration as illustrated, for example, in FIG. 3. Further, the counter storage server 20, the analysis data storage server 30, the web server 40, and one or more information processing apparatuses that implement the organization chart management system 70 are also implemented by the computer having the hardware configuration illustrated in FIG. 3.

FIG. 3 is a block diagram illustrating an example of a hardware configuration of the computer. As illustrated in FIG. 3, the computer 500 includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, a digital versatile disc rewritable (DVD-RW) drive 514 and a medium I/F 516.

Among these elements, the CPU 501 controls entire operation of the computer. The ROM 502 stores a program such as an initial program loader (IPL) used for driving the CPU 501. The RAM 503 is used as a work area for the CPU 501. The HD 504 stores various data such as a control program. The HDD controller 505 controls reading and writing of various data from and to the HD 504 under control of the CPU 501. The display 506 displays various information such as a cursor, menu, window, character, or image. The external device connection I/F 508 is an interface for connecting various external devices. The external device in this case is, for example, a universal serial bus (USB) memory or a printer. The network I/F 509 is an interface for performing data communication using the network 50. The bus line 510 is an address bus, a data bus, or the like for electrically connecting each component such as the CPU 501 illustrated in FIG. 3.

The keyboard 511 is an example of an input device provided with a plurality of keys for allowing a user to input characters, numerals, or various instructions. The pointing device 512 is an example of an input device that allows a user to select or execute a specific instruction, select a target for processing, or move a cursor being displayed. The DVD-RW drive 514 reads and writes various data from and to a DVD-RW 513, which is an example of a removable storage medium. The removable storage medium is not limited to the DVD-RW and may be a digital versatile disc-recordable (DVD-R) or the like. The medium I/F 516 controls reading and writing (storing) of data from and to the storage medium 515 such as a flash memory.

Figure 4:
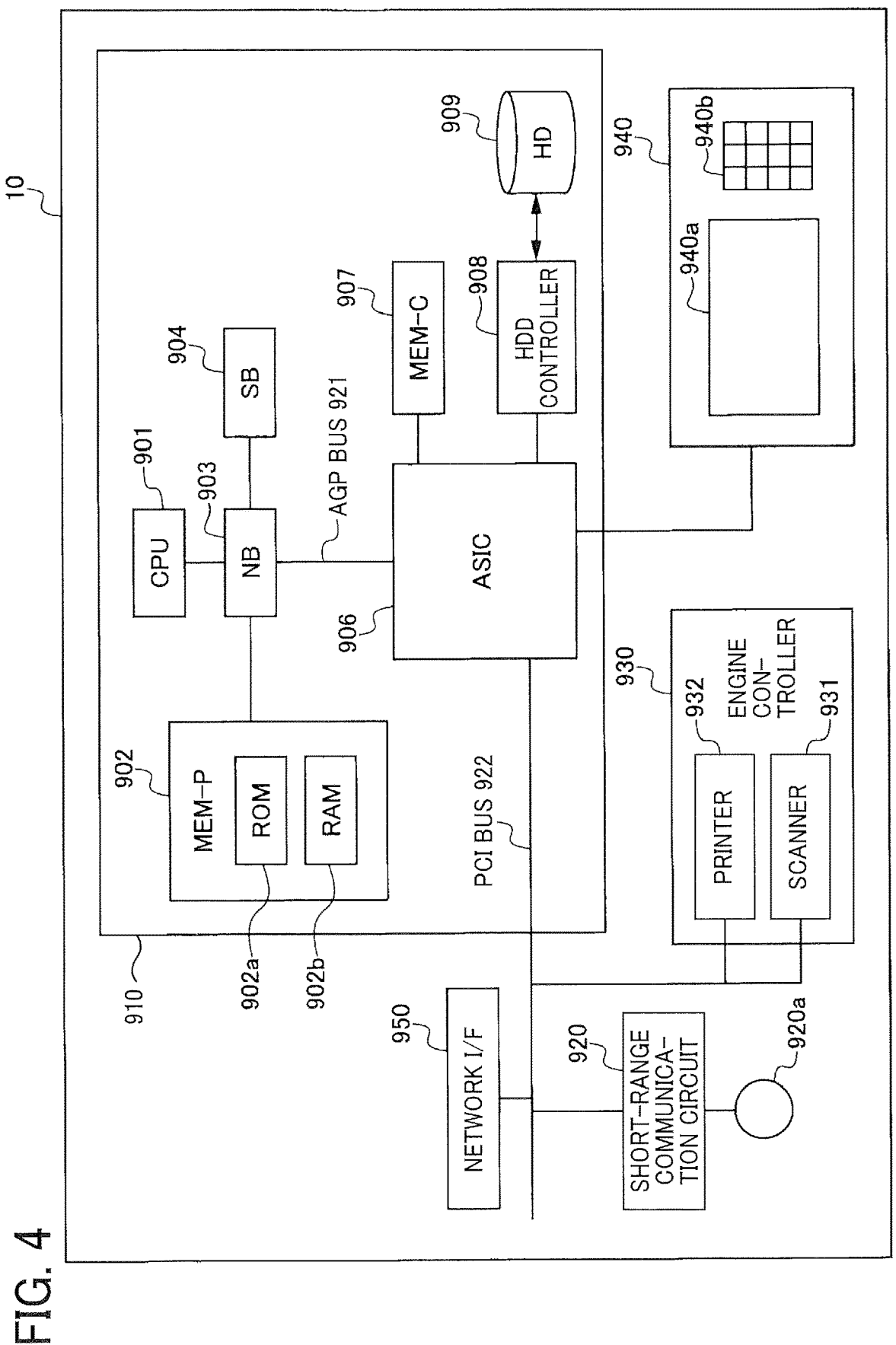
FIG. 4 is a block diagram illustrating a hardware configuration of an example of an output device.

FIG. 4 is a block diagram illustrating a hardware configuration of the output device 10. As illustrated in FIG. 4, the output device 10 includes a controller 910, a short-range communication circuit 920, an engine controller 930, a control panel 940, and a network I/F 950.

The controller 910 includes a CPU 901 as a main processor, a system memory (MEM-P) 902, a north bridge (NB) 903, a south bridge (SB) 904, an Application Specific Integrated Circuit (ASIC) 906, a local memory (MEM-C) 907, an HDD controller 908, and an HD 909 as a storage unit. The NB 903 and the ASIC 906 are connected through an Accelerated Graphics Port (AGP) bus 921.

The CPU 901 is a processor that performs overall control of the output device 10. The NB 903 connects the CPU 901 with the MEM-P 902, SB 904, and AGP bus 921. The NB 903 includes a memory controller for controlling reading or writing of various data with respect to the MEM-P 902, a Peripheral Component Interconnect (PCI) master, and an AGP target.

The MEM-P 902 includes a ROM 902a as a memory that stores program and data for implementing various functions of the controller 910. The MEM-P 902 further includes a RAM 902b as a memory that deploys the program and data, or as a drawing memory that stores drawing data for printing. The program stored in the ROM 902a may be stored in any computer-readable storage medium, such as a compact disc-read only memory (CD-ROM), compact disc-recordable (CD-R), or digital versatile disc (DVD), in a file format installable or executable by the computer, for distribution.

The SB 904 connects the NB 903 with a peripheral component interconnect (PCI) device or a peripheral device. The ASIC 906 is an integrated circuit (IC) dedicated to an image processing use, and connects the AGP bus 921, a PCI bus 922, the HDD controller 908, and the MEM-C 907. The ASIC 906 includes a PCI target, an AGP master, an arbiter (ARB) as a central processor of the ASIC 906, a memory controller for controlling the MEM-C 907, a plurality of direct memory access controllers (DMACs) capable of converting coordinates of image data with a hardware logic, and a PCI unit that transfers data between a scanner 931 and a printer 932 through the PCI bus 922. The ASIC 906 may be connected to a USB interface, or the Institute of Electrical and Electronics Engineers 1394 (IEEE1394) interface.

The MEM-C 907 is a local memory used as a buffer for image data to be copied or a code buffer. The HD 909 is a storage for storing image data, font data used during printing, and forms. The HDD controller 908 reads or writes various data from or to the HD 909 under control of the CPU 901. The AGP bus 921 is a bus interface for a graphics accelerator card, which has been proposed to accelerate graphics processing. Through directly accessing the MEM-P 902 by high-throughput, speed of the graphics accelerator card is improved.

The short-range communication circuit 920 includes a short-range communication antenna 920a. The short-range communication circuit 920 is a communication circuit that communicates in compliance with the near field communication (NFC), the Bluetooth (registered trademark) and the like.

The engine controller 930 includes a scanner 931 and a printer 932. The control panel 940 includes a display panel 940a and operation panel 940b. The display panel 940a is implemented by, for example, a touch panel that displays current settings or a selection screen and receives a user input. The operation panel 940b includes a numeric keypad that receives set values of various image forming parameters such as image density parameter and a start key that accepts an instruction for starting copying. The controller 910 controls all operations of the output device 10. For example, the controller 910 controls drawing, communication, or user input to the control panel 940. The scanner 931 and the printer 932 each performs various image processing, such as error diffusion or gamma conversion.

In response to an instruction to select a specific application through the control panel 940, for example, using a mode switch key, the output device 10 selectively performs a document box function, a copy function, a print function, and a facsimile function. With selection of the print function, the output device 10 operates in a print mode. With selection of the facsimile function, the output device 10 operates in a facsimile mode. When the document box function is selected, the output device 10 operates in a document box mode to store document data. With selection of the copy function, the output device 10 operates in a copy mode.

The network I/F 950 controls communication of data with an external device through the network 50. The short-range communication circuit 920 and the network I/F 950 are electrically connected to the ASIC 906 through the PCI bus 922.

Figure 5:
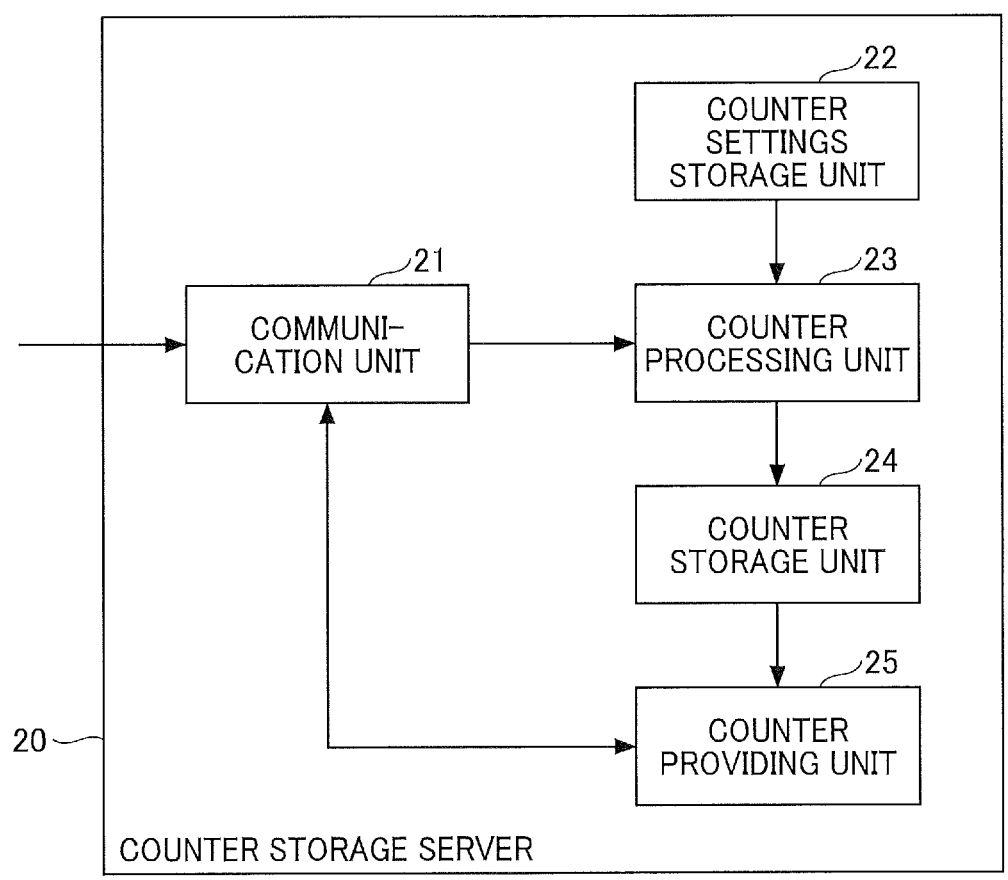
FIG. 5 is a block diagram illustrating a functional configuration of an example of a counter storage server.

The counter storage server 20 according to the present embodiment is implemented by, for example, functional blocks illustrated in FIG. 5. FIG. 5 is a block diagram illustrating a functional configuration of an example of the counter storage server 20. The counter storage server 20 implements the functional blocks as illustrated in FIG. 5 by executing the program stored in any desired memory such as the ROM 502.

As illustrated in FIG. 5, the counter storage server 20 includes a communication unit 21, a counter settings storage unit 22, a counter processing unit 23, a counter storage unit 24, and a counter providing unit 25. The communication unit 21 performs data communication with the outside.

The counter settings storage unit 22 stores counter settings which are described below. The counter settings are information used by the counter processing unit 23 to accumulate the counter value. The counter processing unit 23 causes the counter storage unit 24 to store the daily data for each output device 10 created based on the counter value and the counter settings received by the communication unit 21. The counter storage unit 24 stores the daily data for each output device 10.

In response to a request from the analysis data storage server 30, the counter providing unit 25 provides the analysis data storage server 30 with the daily data stored in the counter storage unit 24 for each output device 10 via the communication unit 21. Further, the counter providing unit 25 provides the daily data stored in the counter storage unit 24 to the web server 40 via the communication unit 21 in response to a request from the web server 40.

Figure 6:
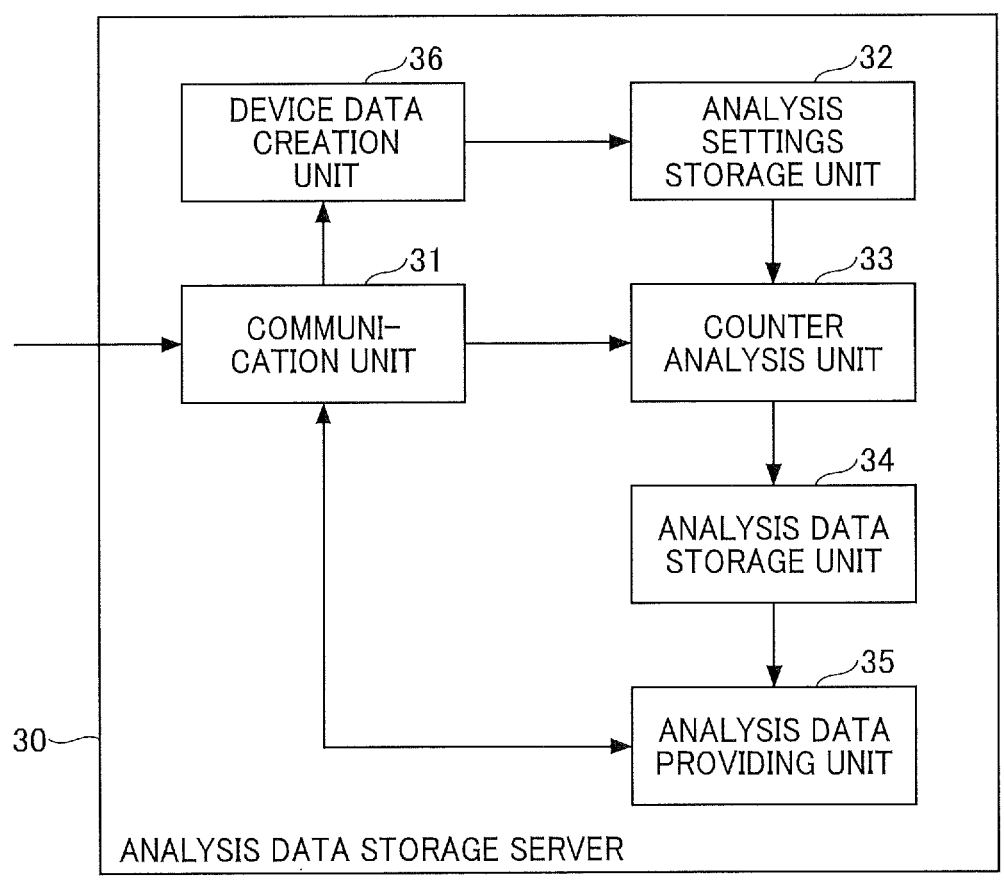
FIG. 6 is a block diagram illustrating a functional configuration of an example of an analysis data storage server.

The analysis data storage server 30 according to the present embodiment is implemented by, for example, functional blocks illustrated in FIG. 6. FIG. 6 is a block diagram illustrating a functional configuration of an example of the analysis data storage server 30. The analysis data storage server 30 implements the functional blocks as illustrated in FIG. 6 by executing the program stored in any desired memory such as the ROM 502.

The analysis data storage server 30 of FIG. 6 includes a communication unit 31, an analysis settings storage unit 32, a counter analysis unit 33, an analysis data storage unit 34, an analysis data providing unit 35, and a device data creation unit 36. The communication unit 31 performs data communication with the outside.

The analysis settings storage unit 32 stores the analysis settings described below. The analysis settings are information used by the counter analysis unit 33 to reconstruct and save daily data in a form suitable for analysis (monthly data for each year, by group, by counter type, etc.). The analysis settings include, for example, group data, device data, device history data, etc., which are described below.

The counter analysis unit 33, based on the daily data and the analysis settings received by the communication unit 31, analyzes the daily data of each output device 10 by the conditions (year/month, group, counter type, etc.) suitable for analysis, reconstructs into monthly data, and stores in the analysis data storage unit 34. The analysis data storage unit 34 stores monthly data for each condition. Further, the analysis data providing unit 35 provides the web server 40 with the monthly data for each condition stored in the analysis data storage unit 34 by the communication unit 31 in response to the request from the web server 40.

The device data creation unit 36 acquires the association information associating the output device 10 and the group received by the web server 40 from the web server 40 through the communication unit 31 and generate device data associating the output device 10 and the group.

Figure 7:
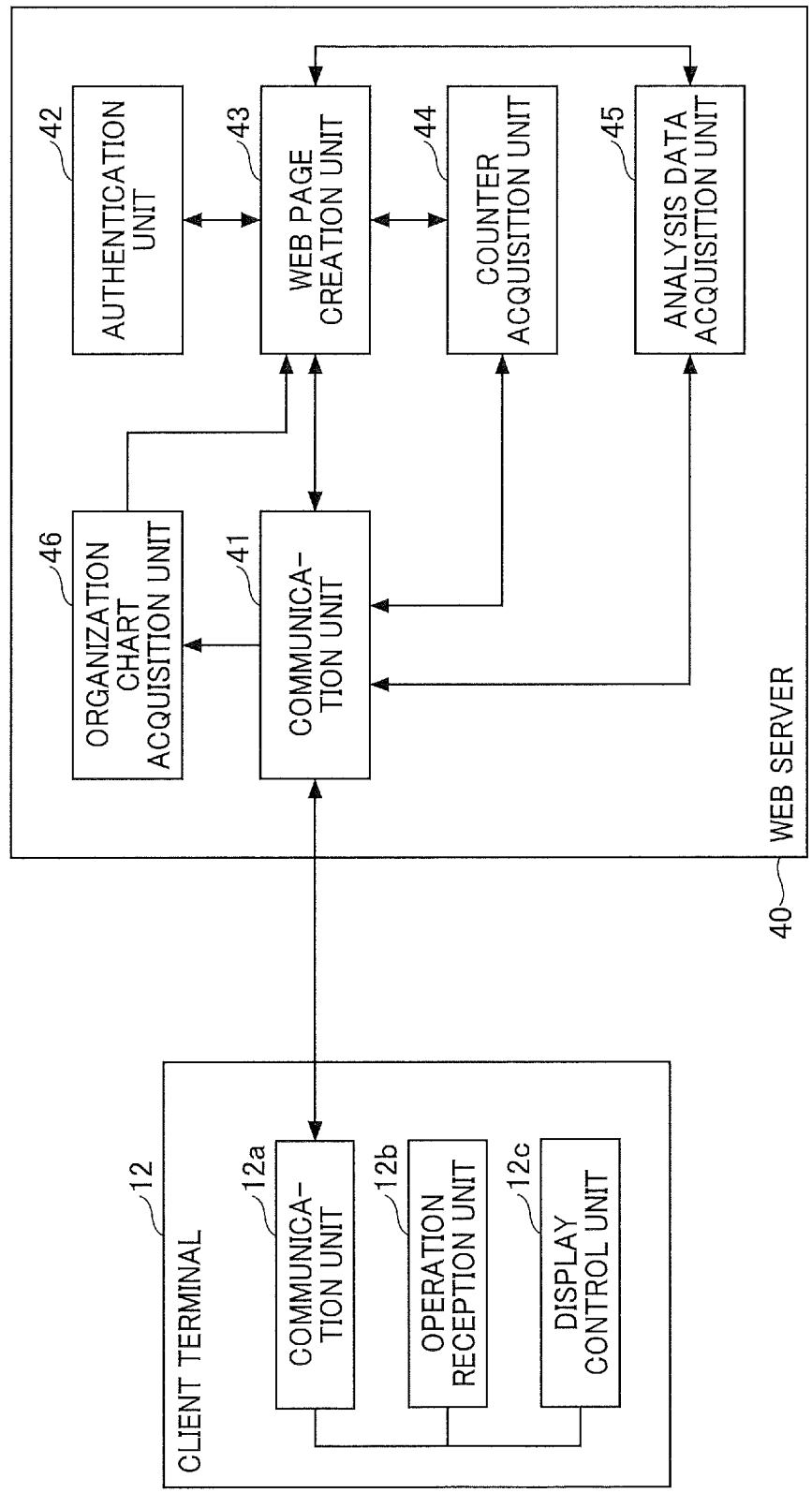
FIG. 7 is a block diagram illustrating a functional configuration of an example of a client terminal and a web server.

The web server 40 according to the present embodiment is implemented by the functional blocks illustrated in FIG. 7, for example. FIG. 7 is a block diagram illustrating a functional configuration of an example of the client terminal 12 and the web server 40. The web server 40 implements the functional blocks as illustrated in FIG. 7 by executing the program stored in any desired memory such as the ROM 502. The web server 40 includes a communication unit 41, an authentication unit 42, a web page creation unit 43, a counter acquisition unit 44, an analysis data acquisition unit 45, and an organization chart acquisition unit 46. The communication unit 41 (first communication unit) performs data communication with the outside.

The authentication unit 42 authenticates the user who operates the client terminal 12. The user is authenticated, for example, by determining whether or not the authentication information (for example, a combination of the user ID and the password) received by the communication unit 41 matches the authentication information registered in advance in the web server 40. Alternatively, authentication may be performed by methods other than described above. The user's authentication information registered in advance may be registered in a database outside the web server 40.

The web page creation unit 43 creates a web page based on the request from the client terminal 12 received by the communication unit 41, transmits the web page to the client terminal 12 by the communication unit 41, and causes the web browser installed on the client terminal 12 to display the web page. Further, the web page creation unit 43 requests the counter acquisition unit 44 or the analysis data acquisition unit 45 for daily data or monthly data, if daily data of the output device 10 or monthly data by condition is required to create the web page.

The web page creation unit 43 uses the organization chart information and the device data acquired by the organization chart acquisition unit 46, when creating a web page for accepting association between each group in the new organization and each output device 10 belonging to the old organization.

The counter acquisition unit 44 acquires the daily data of the output device 10 requested by the web page creation unit 43 from the counter storage server 20 by the communication unit 41 and provides the daily data of the output device 10 to the web page creation unit 43. Further, the analysis data acquisition unit 45 acquires the monthly data for each condition requested by the web page creation unit 43 from the analysis data storage server 30 by the communication unit 41 and provides the received data to the web page creation unit 43.

The organization chart acquisition unit 46 acquires the new organization chart 102 from the organization chart management system 70. Further, the device data is acquired from the analysis data storage server 30.

The client terminal 12 includes a communication unit 12a, an operation reception unit 12b, and a display control unit 12c. The client terminal 12 implements the functional blocks as illustrated in FIG. 7 by executing a program, for example, the web browser.

The communication unit 12a (second communication unit) communicates with the web server 40 and receives screen data of a screen for accepting the allocation of the output device 10 to the group in the new organization. Further, the association information of the output device 10 and the group set by the user is transmitted to the web server 40.

The operation reception unit 12b receives a user operation on the client terminal 12 (for example, allocation of the output device 10 to the group in the new organization). The display control unit 12c analyzes the screen data of the screen received from the web server 40 and displays the screen on the display 506.

FIG. 8 is a diagram illustrating the counter settings according to the present embodiment. The counter settings include a device ID, a media access control (MAC) address, and a daily data ID as items. The device ID is an example of identification information that uniquely identifies the output device 10. The MAC address is an example of identification information for uniquely identifying the output device 10 on the communication network. The daily data ID is an example of identification information for uniquely identifying the daily data of the output device 10 identified by the device ID or the MAC address. The device ID includes an internet protocol (IP) address, a MAC address, a serial number, and the like. The device ID also includes the ID number recorded in the recording medium connected to the output device 10.

FIG. 9 is a diagram illustrating an example of the daily data. The daily data includes a daily data ID, a date (year/month/date), and various counter data as items. The daily data ID is an example of identification information for identifying the daily data. The date is the date on which the counter data of the corresponding daily data is counted. The various counter values are daily counter values of different types such as total, by function of the output device 10, by color of printed image (color, monochrome, etc.), and by paper size.

FIG. 10 is a diagram illustrating an example of group data. The group data includes a group ID, a group name, an address, a telephone number, a mail address, and a monthly data calculation date as items. The group ID is an example of identification information for uniquely identifying the group. The group indicates a set composed of a certain unit, and includes companies, organizations, departments, and the like. The group name is a name of the group. The address, telephone number, mail address and monthly data calculation date are the address, telephone number, mail address and monthly data calculation date of the group. The monthly data calculation date is a reference date for creating monthly data from daily data. The mail address may be the mail address (such as email address) of an employee or the like belonging to the group.

FIG. 11A is a diagram illustrating an example of the device data. The device data includes the device ID, the group ID, the MAC address, the daily data ID, and the monthly data ID as items. In the device data, the device ID, the group ID, and the MAC address are associated with each other, thereby associating the group with the output device 10 used by the group.

Further, the device data associates the group ID with the daily data ID and the monthly data ID, thereby associating the group with the daily data and monthly data of the group. Furthermore, since the device data associates the device ID and the MAC address with the daily data ID and the monthly data ID, the output device 10 is associated with the daily data and the monthly data of the output device 10.

FIG. 11B is a diagram illustrating an example of device history data. The device history data includes the device ID, an update date, and the group ID as items. The device history data is information indicating the transition of the group to which the output device 10 identified by the device ID belongs. The update date indicates the date when the group to which the output device 10 belongs is changed. The analysis data storage server 30 extracts one or more records from the device history data of FIG. 11B using the device ID as a key and determines the group ID of the group to which the output device 10 belongs and a period during which the output device 10 belongs to the group.

FIG. 11C is a diagram illustrating an example of monthly data. The monthly data includes a monthly data ID, month and year, and various counter data as items. The monthly data ID is an example of identification information for identifying the monthly data. The month and year is the month and year on which the counter data of the corresponding monthly data is counted. The various counter values are monthly counter values of different types such as total, by function, by color, and by paper size.

Figure 12:
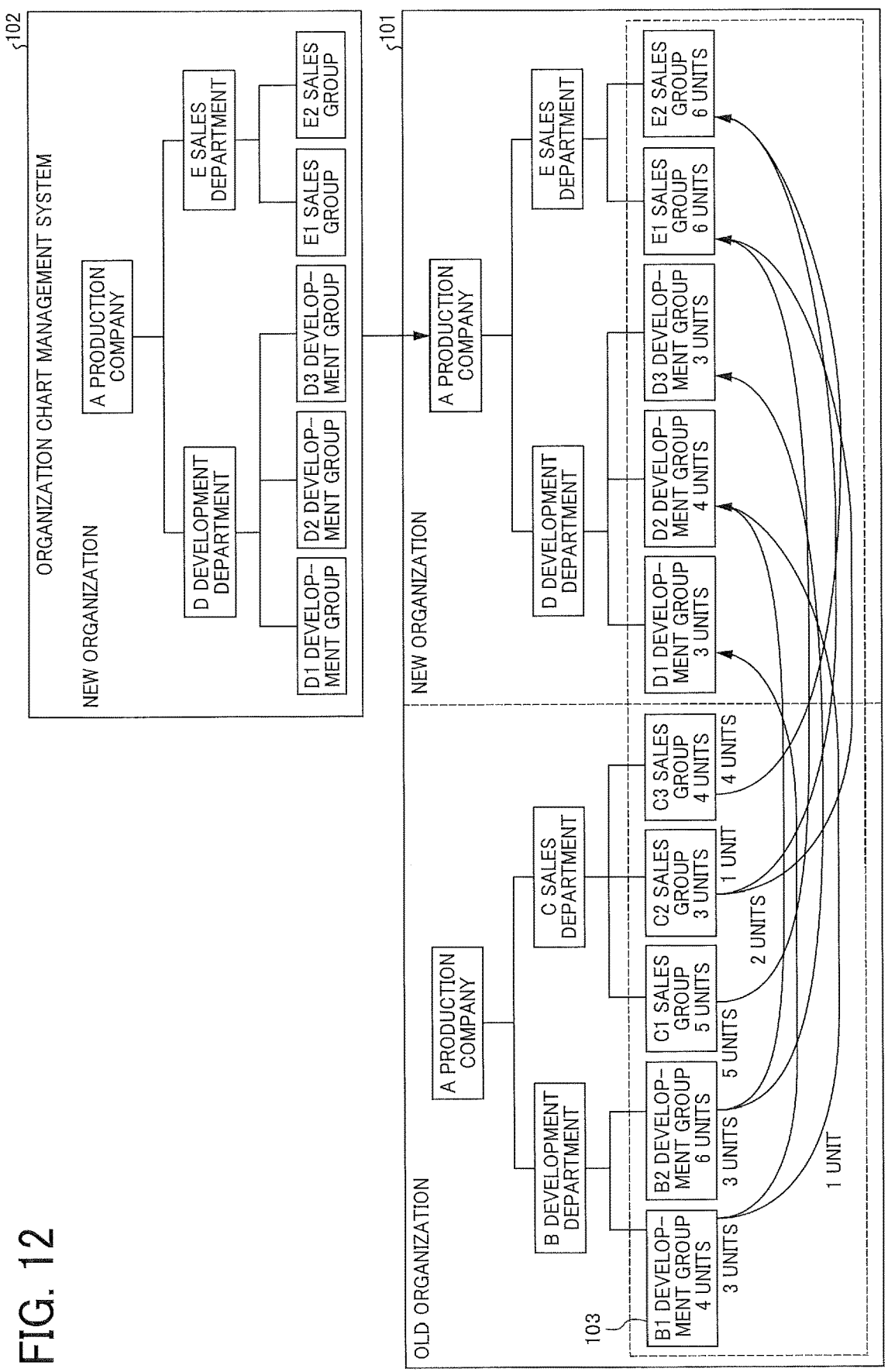
FIG. 12 is a diagram illustrating an example of an old organization chart and a new organization chart.

FIG. 12 is a diagram illustrating an example of the old organization chart 101 and the new organization chart 102. The new organization chart 102 is stored in the organization chart management system 70. For the illustrative purposes, the two organization charts 101 and 102 are displayed as illustrated in FIG. 12, but these two organization charts may not be displayed at the same time. Alternatively, the old organization chart and the new organization chart may be displayed at the same time as illustrated in FIG. 12. In the example illustrated in FIG. 12, selection of a group in the old organization chart is accepted, one or more output devices 10 belonging to the group is displayed in a selectable way, and selection of a group in the new organization chart as a transfer destination is accepted.

As illustrated in the device data of FIG. 11A, the group and the output device 10 are already associated with each other based on the old organization chart 101 as follows.
B1 development group; 4 units
B2 development group; 6 units
C1 sales group; 5 units
C2 sales group; 3 units
C3 sales group; 4 units The groups of the new organization chart 102 are the D1 development group, the D2 development group, the D3 development group, the E1 sales group, and the E2 sales group. The user assigns each output device 10 belonging to the group in the old organization to the group in the new organization. As an example, the following allocation is made. Of the four units belonging to the B1 development group, three units are assigned to the D1 development group and one unit is assigned to the D2 development group. Of the six units belonging to the B2 development group, three units are assigned to the D2 development group and three units are assigned to the D3 development group. Five units belonging to the C1 sales group are assigned to the E1 sales group. Of the three units belonging to the C2 sales group, one unit is assigned to the E1 sales group and two units are allocated to the E2 sales group. Four units belonging to the C3 sales group are assigned to the E2 sales group.

FIGS. 13A to 15 are diagrams illustrating user interfaces displayed by the client terminal 12. The user interface is displayed on the web page created by the web server 40.

Figure 13A:
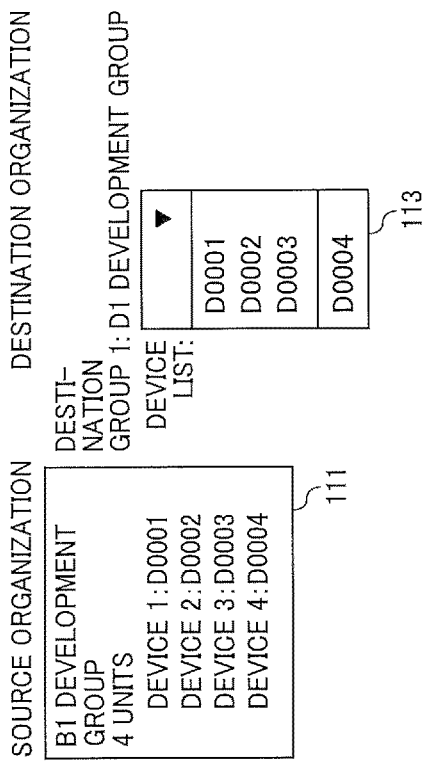
FIGS. 13A to 13C are diagrams illustrating a first set of examples of user interfaces displayed by the client terminal.

As illustrated in FIG. 13A, the user selects the transfer destination group for each output device 10 belonging to each transfer source group. On the user interface, a device list 111 indicating the output devices 10 belonging to the transfer source group is displayed. The web page creation unit 43 creates the screen data for displaying the device list 111 of the output devices 10 associated with the same group ID from the device data. Further, the transfer destination group is displayed in a selectable manner from a pull-down menu 112 according to the screen data created by the web page creation unit 43. The web page creation unit 43 creates the screen data for the pull-down menu displaying the one or more groups of the new organization based on the new organization chart information.

In FIG. 13A, the user focuses on the B1 development group, and selects a transfer destination group from the pull-down menu 112. In FIG. 13A, it is assumed that the D1 development group is selected.

Figure 13B:
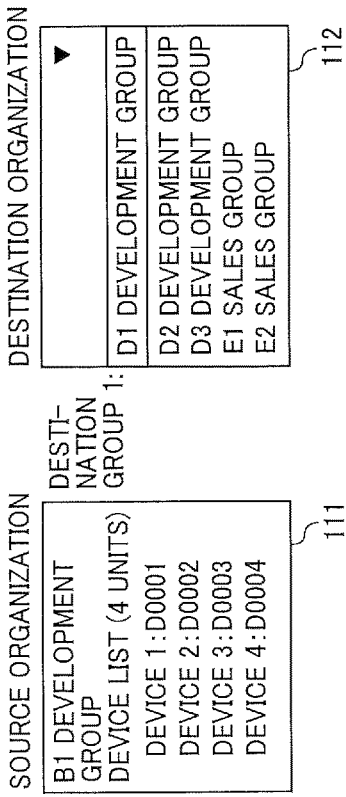

As illustrated in FIG. 13B, when the transfer destination group is selected, the display control unit 12c of the client terminal 12 displays a device list 113 of the output devices 10 belonging to the transfer source group in a selectable manner. The device list 113 is the same in content as the device list 111. The user selects the output device 10 to be allocated to the D1 development group from the device list 113. In FIG. 13B, D0001, D0002 and D0003 are selected.

Figure 13C:
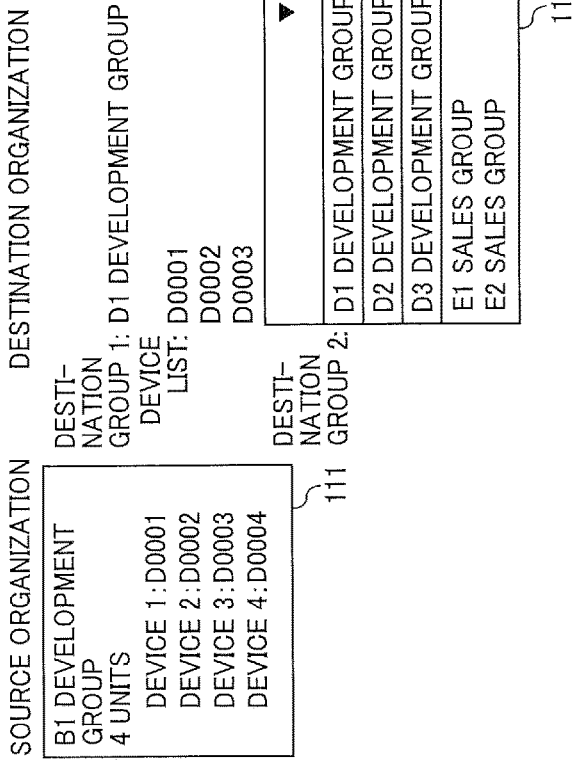

Next, as illustrated in FIG. 13C, the user sets the transfer destination group of the output device 10 belonging to the B1 development group from the pull-down menu 112 again. In FIG. 13C, it is assumed that the D2 development group is selected.

Figure 14A:
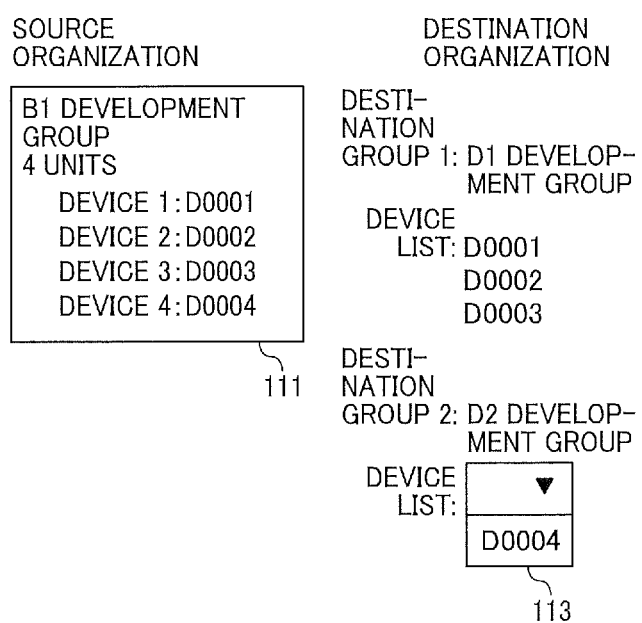
FIGS. 14A to 14C are diagrams illustrating a second set of examples of user interfaces displayed by the client terminal.

As illustrated in FIG. 14A, when the transfer destination group is selected, the display control unit 12c of the client terminal 12 displays the device list 113 of the output devices 10 that have not yet transferred among the one or more output devices 10 belonging to the transfer source group in the selectable manner. The output device 10 that has already transferred is not displayed. The transferred device is deleted from the device list 113. Such control is performed by the display control unit 12c recording the output device 10 selected in the device list 113 of the output devices 10. Therefore, in FIG. 14A, D0004 is displayed in the device list 113 of the output device 10. The user selects from the list 113 the output device 10 to transfer to the D2 development group. In FIG. 14A, D0004 is selected.

Figure 14C:
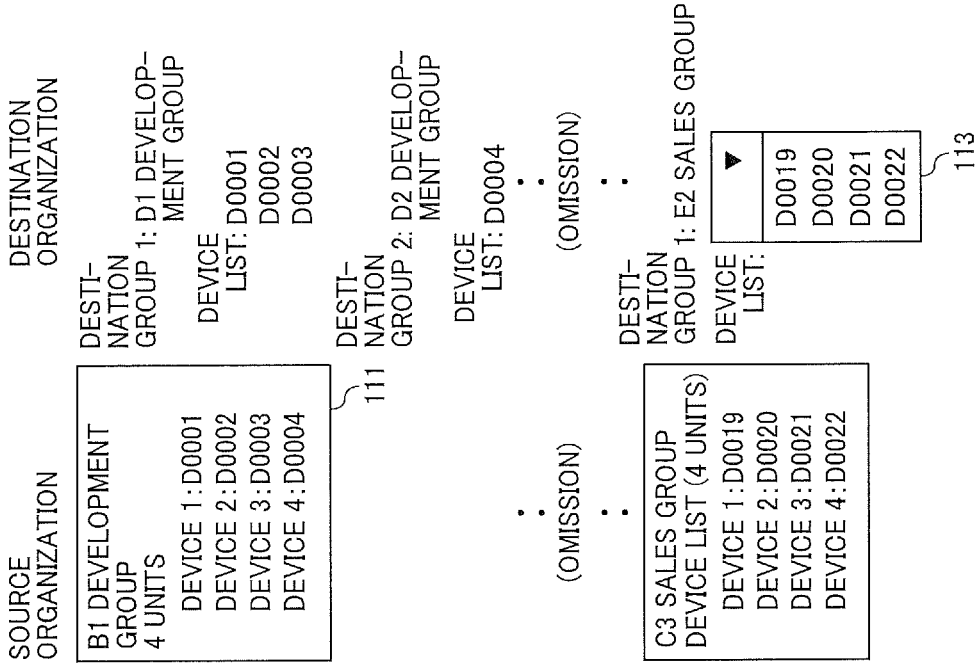
Figure 14B:
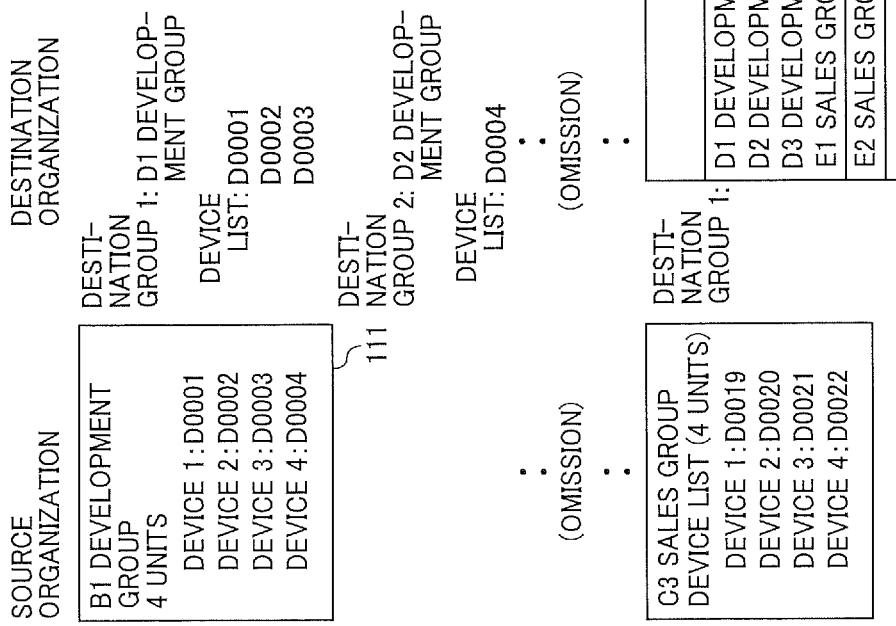

As illustrated in FIG. 14B, association information indicating the output device 10 (D0001, D0002, D0003) transferred to the transfer destination D1 development group and the output device 10 (D0004) transferred to the transfer destination D2 development group is set.

The user performs the above processing for each transfer source group. Next, the user focuses on the C3 sales group and selects the transfer destination group from the pull-down menu 112. In FIG. 14B, it is assumed that the E2 sales group is selected.

As illustrated in FIG. 14C, when the transfer destination group is selected, the display control unit 12c of the client terminal 12 displays the device list 113 of the output devices 10 belonging to the transfer source group. The user selects, from the device list 113, the output device 10 to transfer to the E2 sales group. In FIG. 14C, D0019, D0020, D0021, and D0022 are selected.

Figure 15:
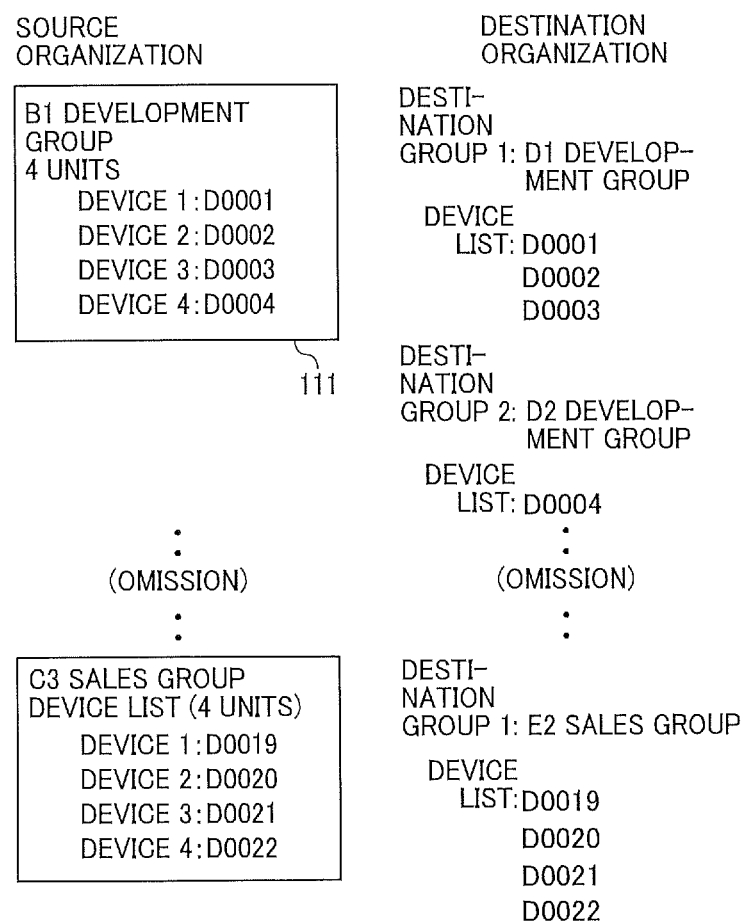
FIG. 15 is a diagram illustrating an example of user interface displayed by the client terminal.

As described above, the transfer destination groups for all the output devices 10 belonging to the transfer source organization, B1 development group, B2 development group, C1 sales group, C2 sales group, and C3 sales group are set (association information) as illustrated in FIG. 15. The association information set by the user is transmitted to the web server 40 and is transmitted from the web server 40 to the analysis data storage server 30.

Figure 16:
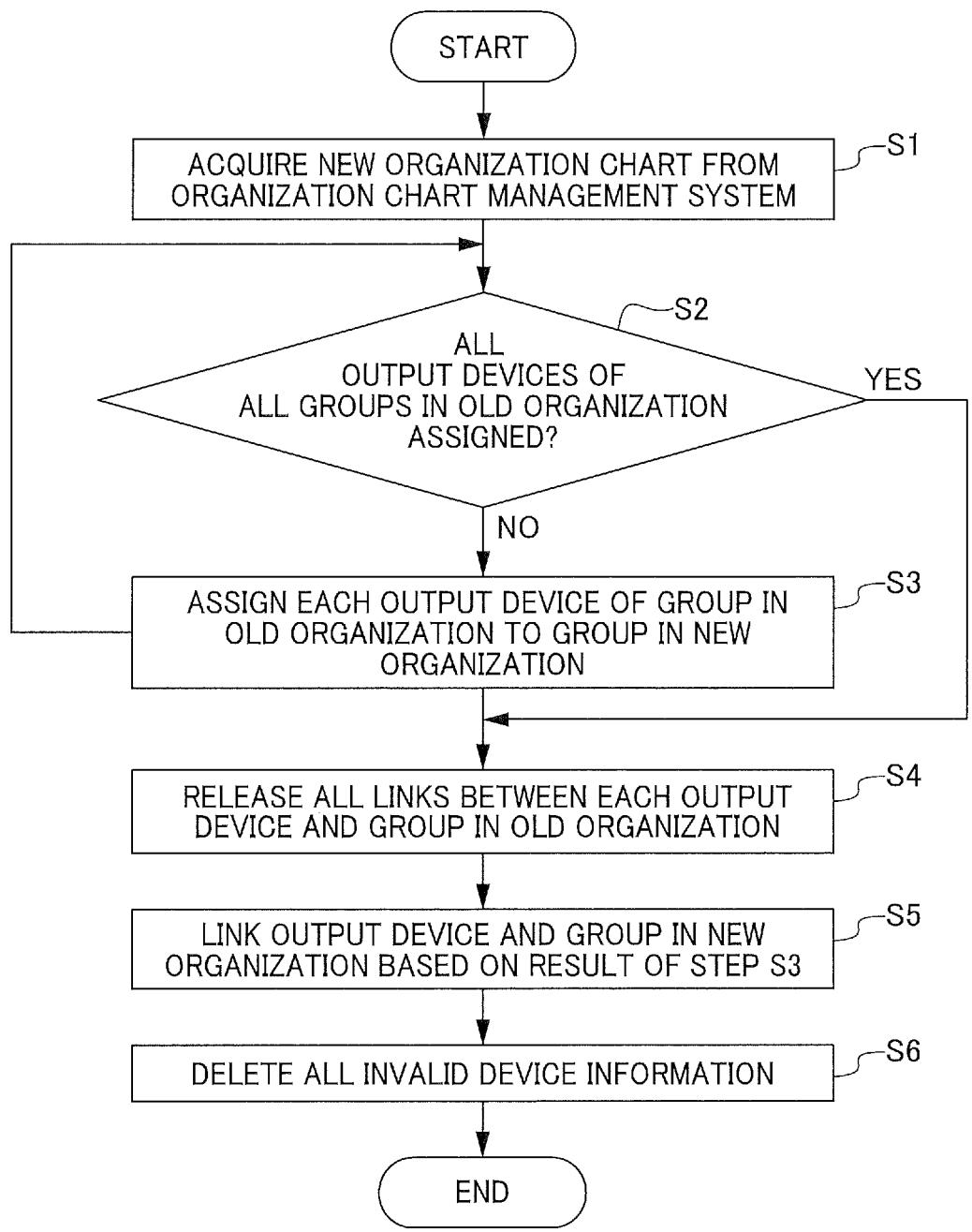
FIG. 16 is a flowchart illustrating an example of a process for assigning an output device to a group in the information processing system.

FIG. 16 is a flowchart illustrating an example of a process for assigning an output device 10 to a group in the information processing system 1. The process of FIG. 16 starts when the user operates the client terminal 12 to request the web server 40 to assign the output device 10 belonging to the transfer source group to the transfer destination group.

In step S1, the organization chart acquisition unit 46 of the web server 40 acquires the new organization chart 102 from the organization chart management system 70 through the communication unit 41. In addition, the organization chart acquisition unit 46 acquires the device data of the old organization from the analysis data storage server 30.

The web page creation unit 43 of the web server 40 creates screen data of the web page including the user interface described in FIGS. 13A to 15 based on the device data and the new organization chart 102. Since the output device 10 belonging to each group in the old organization is registered in the device data and the new group is described in the new organization chart 102, the web page creation unit 43 can create the above user interface.

The communication unit 12a of the client terminal 12 receives the screen data of the web page from the web server 40, and the display control unit 12c displays the web page. In steps S2 and S3, the user assigns the one or more output devices 10 to the one or more groups of the new organization until the assignment of all the groups of the old organization is completed. The operation reception unit 12b receives this operation and creates association information in which the one or more groups of the new organization and the one or more output devices 10 are associated with each other.

The communication unit 12a of the client terminal 12 transmits the association information to the web server 40. The web server 40 transmits the association information to the analysis data storage server 30 and the device data creation unit 36 of the analysis data storage server 30 starts creating the device data.

In step S4, the device data creation unit 36 releases the correspondence between the output device 10 and the group. For example, the current device data is invalidated. Invalidating refers to saving with a different file name.

In step S5, the device data creation unit 36 associates or links the group in the new organization with the output device 10 based on the association information. For example, a copy of the invalidated device data is created, and the group ID of the transfer destination group to which the output device 10 is assigned is set in the device data group ID field. Thereby, the device ID and the new group ID is associated with each other. This device data is stored in the analysis settings storage unit 32 as new device data.

In step S6, the device data creation unit 36 deletes invalidated device data.

Figure 17:
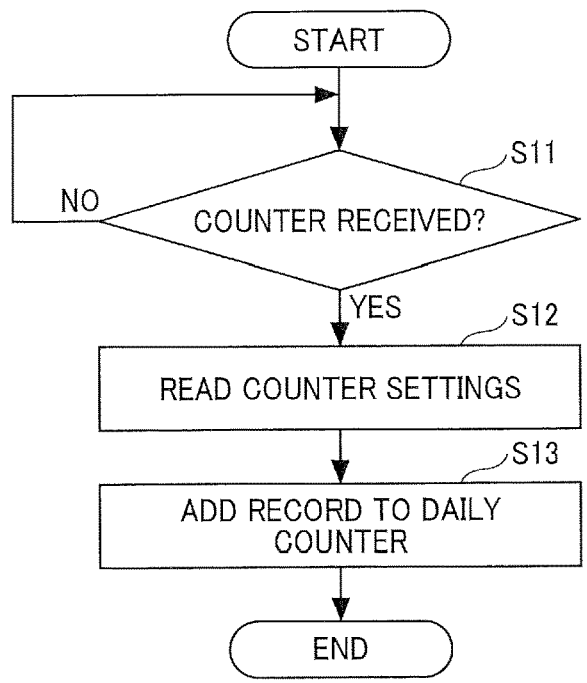
FIG. 17 is a flowchart illustrating an example of a counter storage process.

The counter storage server 20 of the information processing system 1 according to the present embodiment stores the counter data according to a process illustrated in FIG. 17, for example. FIG. 17 is a flowchart illustrating an example of a counter storage process.

In step S11, the counter processing unit 23 of the counter storage server 20 waits until the counter processing unit 23 receives the counter value associated with the device ID or the MAC address from the output device 10 or the intermediary device 14 in the customer environment. In response to receiving the counter value associated with the device ID or the MAC address, the counter processing unit 23 uses the device ID or the MAC address as a key to retrieve the counter settings of FIG. 8 from the counter settings storage unit 22 in step S12.

In step S13, the counter processing unit 23 stores, in the counter storage unit 24, a daily data record created by adding the daily data ID to the received counter value based on the counter settings read in step S12.

Figure 18:
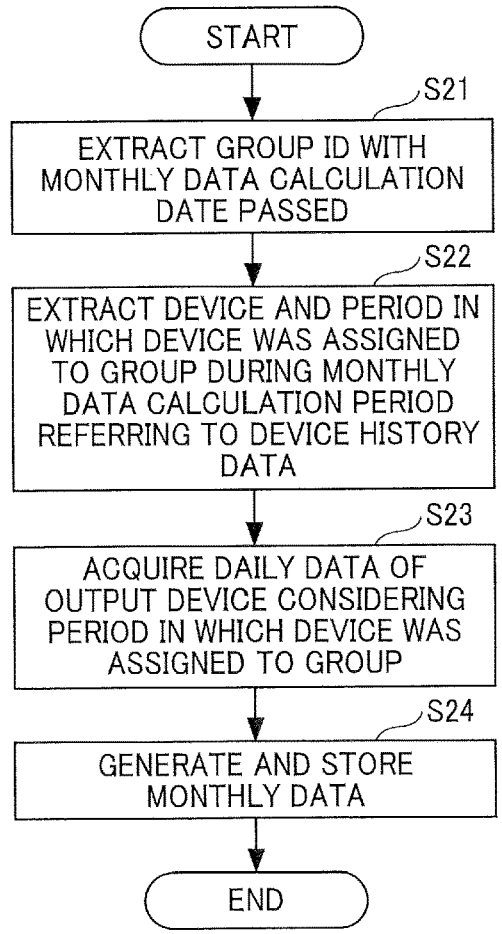
FIG. 18 is a flowchart illustrating an example of a counter analysis process.

The analysis data storage server 30 of the information processing system 1 according to the present embodiment analyzes the counter data according to a process illustrated in FIG. 18, for example. FIG. 18 is a flowchart illustrating an example of a counter analysis process.

In step S21, the counter analysis unit 33 of the analysis data storage server 30 refers to the group data of FIG. 10 included in the analysis settings, determines and extracts the group ID of the group whose monthly data calculation date has passed based on the current date and time and the monthly data calculation date included in the group data. In step S22 and subsequent steps, the monthly data of the group whose group ID is extracted is created.

In step S22, the counter analysis unit 33 refers to the update date and group ID of the device history data in FIG. 11B, and the device ID of the output device 10 that belonged to the group having the group ID extracted in step S21 during the period to create monthly data, and period of belonging in the group are extracted. In the process of step S22, for example, even if the output device 10 is transferred during the period to create monthly data, a period in which the output device 10 belonged to the group can be determined based on the update date.

In step S23, the counter analysis unit 33 considers the period in which the output device 10 belonged to the group, and the daily data of the output device 10 while belonging to the group is acquired by requesting from the counter storage server 20. Specifically, the communication unit 31 transmits a request for the daily data included in the period that the output device belonged in the group extracted in step S22 for the device ID of the output device 10 extracted in step S22. In response to the request received by the communication unit 21, the counter storage server 20 transmits the daily data for each output device 10 stored in the counter storage unit 24 from the communication unit 31 to the analysis data storage server 30 through the counter providing unit 25. In step S24, the counter analysis unit 33 creates the monthly data illustrated in FIG. 11C from the daily data acquired from the counter storage server 20 and stores the monthly data in the analysis data storage unit 34.

Note that the flowchart of FIG. 18 illustrates an example in which monthly data is created from daily data if the monthly data calculation date of the group is passed, but the present disclosure is not limited to this example. For example, the counter analysis unit 33 may create the monthly data from the daily data at the timing when the web server 40 requests the monthly data. Moreover, the counter analysis unit 33 may create weekly data, quarterly data, or annual data instead of the monthly data.

Figures 19A, 19B:
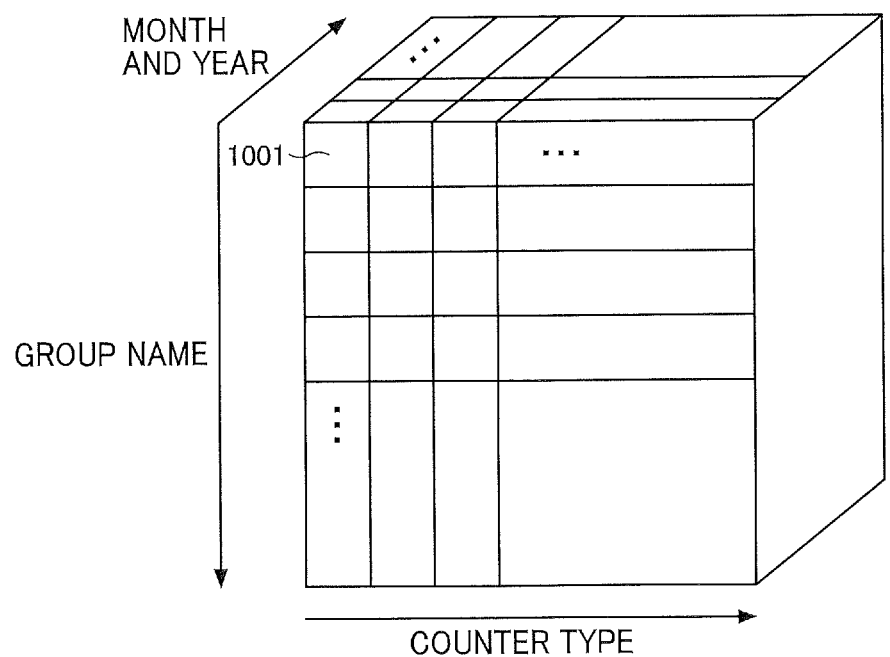
FIG. 19A and FIG. 19B are diagrams illustrating an example of an online analytical processing (OLAP) cube.

In step S24, the counter analysis unit 33 creates, for example, an OLAP cube 1001 as illustrated in FIG. 19A and FIG. 19B from the acquired daily data as monthly data by conditions (year/month, group, counter type, etc.) suitable for analysis. FIG. 19A and FIG. 19B are diagrams illustrating an example of the OLAP cube.

FIG. 19A is a configuration diagram of monthly data of an example of the OLAP cube 1001 created based on the acquired daily data. In the OLAP cube 1001 of FIG. 19A, group name, month and year, device, and counter type are set as conditions. For example, as illustrated in FIG. 19B, the OLAP cube 1001 of FIG. 19A indicates that the counter value can be analyzed by month and year, group name, and counter type. In FIG. 19B, the OLAP cube 1001 is added in the month and year (time) axis direction every time the group monthly data calculation date elapses. For example, monthly data of a specific group name and a specific month and year can be extracted from the OLAP cube 1001, since the group name can be identified from the group data illustrated in FIG. 10 if the group ID and the month and year is identified. Note that the group ID may be set as the condition of the OLAP cube 1001 instead of the group name.

Although the OLAP cube 1001 is described as an example of data structure of a database, a database having data structure of another format may be used.

The information processing system 1 according to the present embodiment displays the web page according to a process illustrated in FIG. 20, for example. FIG. 20 is a sequence diagram illustrating an example of a process of displaying the web page.

In step S31, for example, the user in the customer environment operates the client terminal 12 to send a login request to the web server 40. The web server 40 associates and stores a user ID with a group ID of a group to which the user belongs as user information. In step S32, the authentication unit 42 of the web server 40 authenticates the user who has requested login based on the user authentication information included in the login request received by the communication unit 41. FIG. 20 illustrates an example of successful authentication. If the authentication fails, the processes after step S33 are not performed.

In step S33, the analysis data acquisition unit 45 of the web server 40 identifies the group ID associated with the user ID of the user who has succeeded in the login authentication and acquires the monthly data associated with the identified group ID from the analysis data storage server 30. Specifically, the analysis data acquisition unit 45 of the web server 40 identifies the group ID associated with the user ID of the logged-in user, transmits a request for monthly data associated with the identified group ID to the analysis data storage server 30 by the communication unit 41, and receives the monthly data transmitted from the analysis data storage server 30 by the communication unit 41 in response to the request.

In step S34, the web page creation unit 43 of the web server 40 creates screen data for a top page 1100 which is described below, including the monthly data acquired from the analysis data storage server 30. In step S35, the web server 40 transmits the screen data of the top page 1100 to the client terminal 12 by the communication unit 41. The web browser of the client terminal 12, which has received the screen data in step S36, displays the top page 1100 illustrated in FIG. 21, for example.

Figure 21:
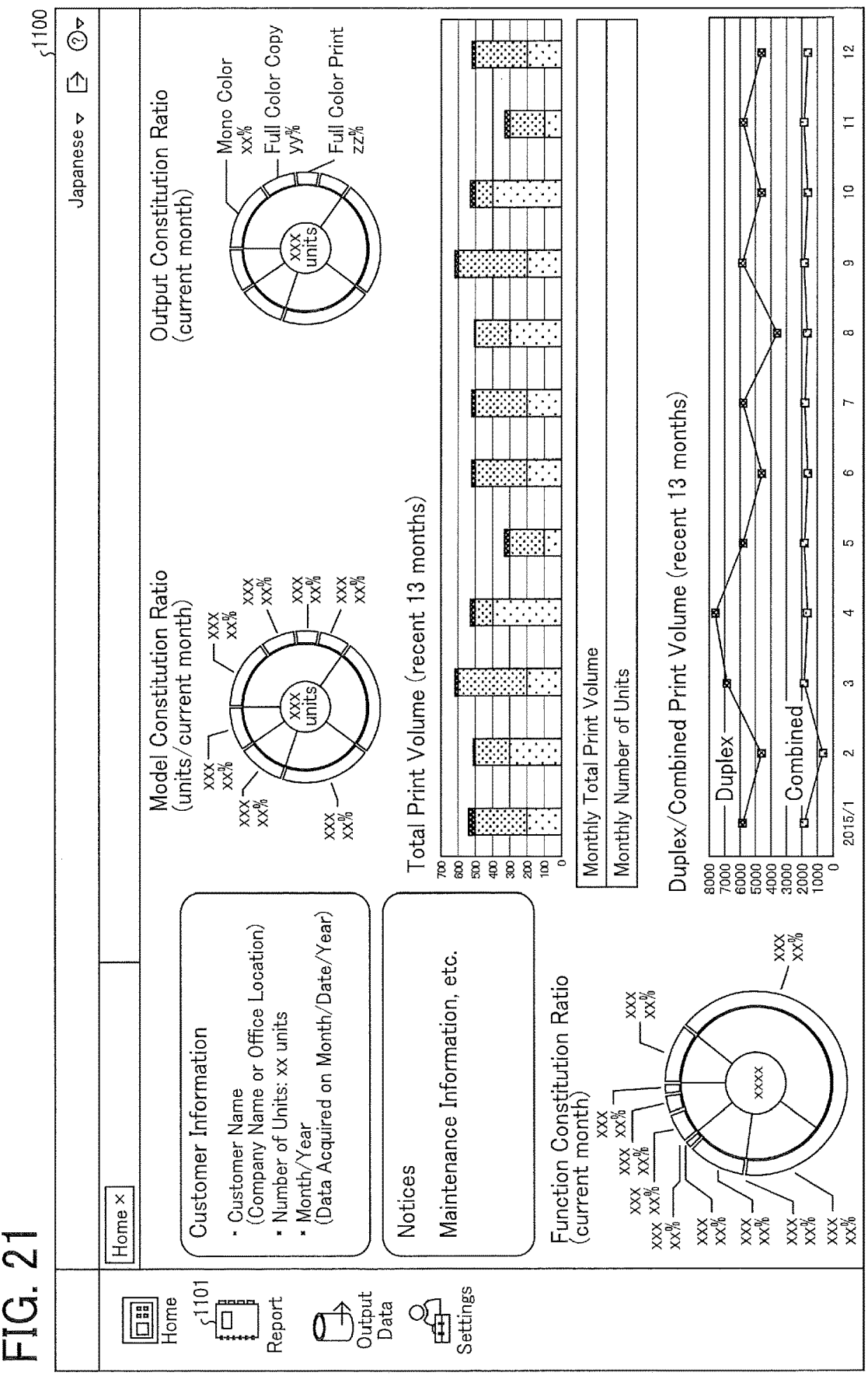
FIG. 21 is a diagram illustrating an example of a top page.

FIG. 21 is a diagram illustrating an example of a top page. The user can display a condition selection screen for selecting condition for the monthly data by pressing a report button 1101 on the top page 1100. The user selects the conditions such as the group ID and the device ID from the condition selection screen to display the monthly data for each selected condition on the web browser of the client terminal 12.

For example, the monthly data for each group displayed on the web browser of the client terminal 12 is created considering the output device 10 transferred from another group to the selected group and the output device 10 transferred from the selected group to another group as described above.

As described above, in the information processing system 1 of the present embodiment, the user manually inputs and defines which group in the new organization each output device 10 of the old organization should belong to. Based on the association information, the output device 10 and the new organization is automatically associated with each other. Further, since the output device 10 and the new organization is automatically associated with each other, the association between the output device 10 and the old organization is released, and the device data of the old organization is automatically deleted.

As a result, when the organizational change occurs, it is possible to reduce the work load in releasing the association between the output device 10 and the old organization and in deleting the device data of the old organization.

Further, since the new organization chart 102 can be obtained by copying, it is possible to reduce the work load in creating a new organization and further reduce the work load required when the organization is changed.

In the second embodiment, an information processing system 1 for providing a user interface configured to assign the output device 10 to a group based on the function of the output device 10 is described.

In the present embodiment, the functions of the counter storage server 20 and the analysis data storage server 30 may be the same as the functions illustrated in FIG. 5 and FIG. 6 of the first embodiment.

Figure 22:
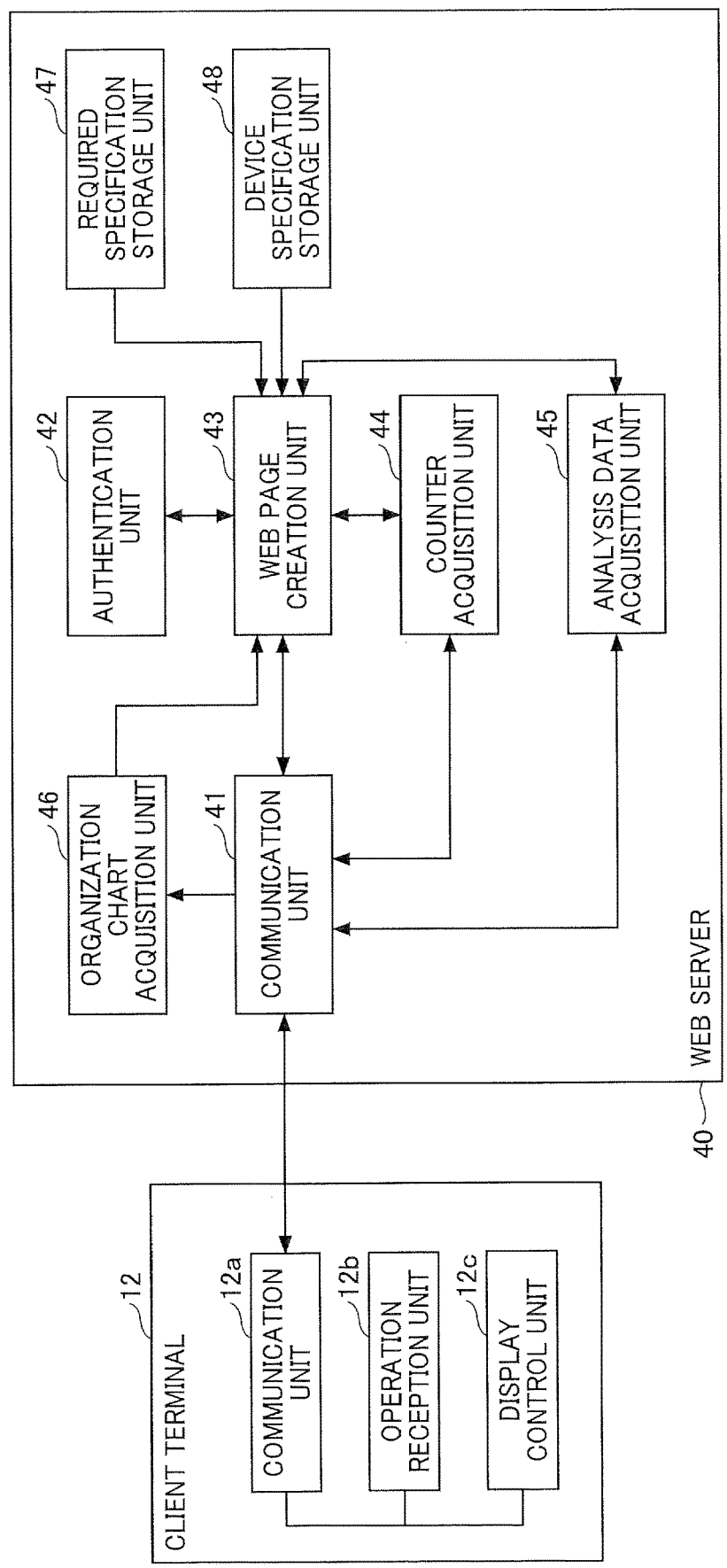
FIG. 22 is a block diagram illustrating an example of a functional configuration of a web server according to a second embodiment.

FIG. 22 is a block diagram illustrating an example of a functional configuration of the web server 40 according to the present embodiment. The web server 40 of the present embodiment includes a required specification storage unit 47 and a device specification storage unit 48. The specification information of the output device 10 requested by the new organization is required specification information, and the information related to the specification of the output device 10 belonging to each group in the old organization is the device specification information. With the functional configuration described above, the client terminal 12 can automatically determine whether or not the output device 10 belonging to the old organization satisfies the specifications required by the new organization. Since the user is provided with the information indicating whether or not the required specifications are satisfied, it is possible to further enhance the convenience.

FIG. 23 is a schematic diagram illustrating required specification information stored in a required specification storage unit 47. As illustrated in FIG. 23, the required specification information includes a number of output devices 10, model type, print speed, presence or absence of a scanner function, and presence or absence of a facsimile function for each group in a new organization. The user collectively registers the request from each group in the new organization in the web server 40 to generate the required specification information.

FIG. 24 is a schematic diagram illustrating device specification information stored in a device specification storage unit 48. As illustrated in FIG. 24, the device specification information includes the device ID of the output device 10 belonging to the group in the old organization, model type, print speed, presence or absence of scanner function, and presence or absence of facsimile function. The device specification information is generated from the device data by the analysis data storage server 30 and transmitted to the web server 40, for example. Alternatively, the device specification information may be created by the user.

The web page creation unit 43 of the web server 40 uses the required specification information and the device specification information to create screen data of a user interface to display, by JavaScript (registered trademark), whether the output device 10 satisfies all the specifications requested by the new organization.

Figure 25A:
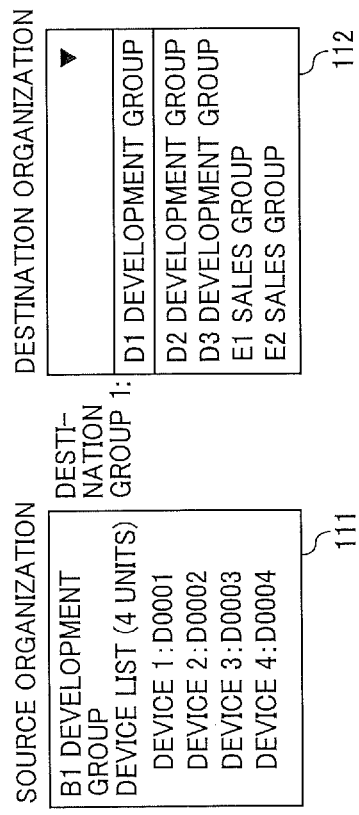
FIG. 25A and FIG. 25B are diagrams illustrating an example of user interface displayed by the client terminal.
Figure 25B:
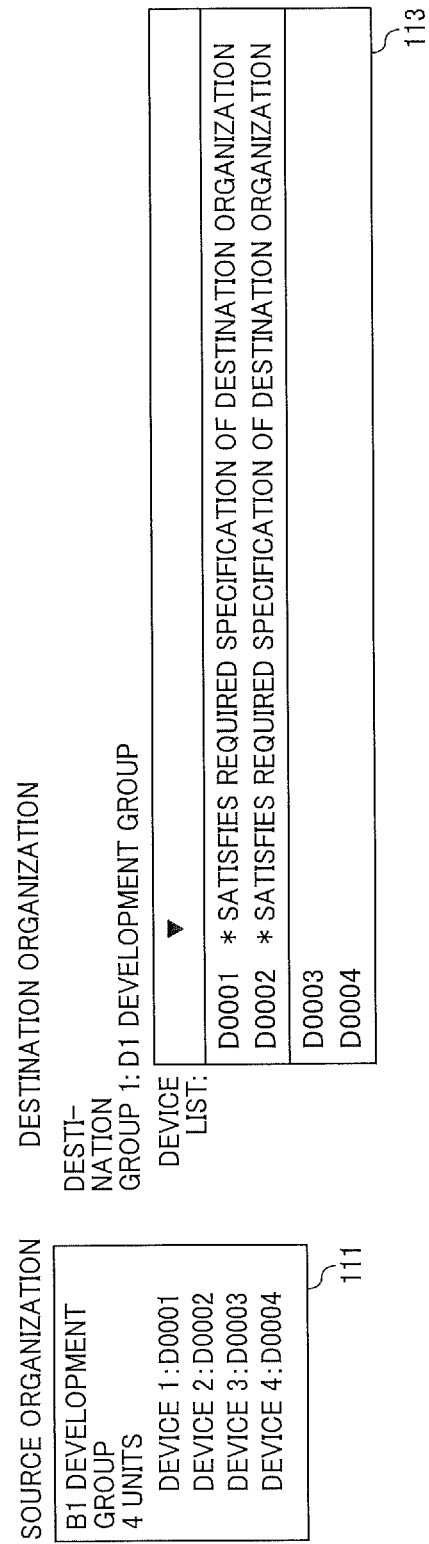

FIG. 25A and FIG. 25B are diagrams illustrating an example of user interface displayed by the client terminal 12. FIG. 25A is the same as FIG. 13A, and assuming that the user is focusing on the B1 development group, the device list 111 of the B1 development group is displayed. Further, the user sets the transfer destination group of each transfer source output device 10 from the pull-down menu 112. In FIG. 25A, it is assumed that the D1 development group is selected.

The display control unit 12c of the client terminal 12 executes the screen data from the web server 40 and compares the required specification information desired by the D1 development group with the device specification information of the output device 10 belonging to the B1 development group. The display control unit 12c displays one or more output devices belonging to the group in the old organization in a selectable manner according to the result of comparing the required specification information and the device specification information. For example, if there is an output device 10 of the old organization that satisfies the required specification information, the display control unit 12c displays accordingly. The comparison is performed by brute force, and the comparison result of the combination that maximizes the number of output devices 10 that satisfy the required specification information is used.

For example, according to the required specification information of FIG. 23 and the device specification information of FIG. 24, the output device 10 of D0001 of the B1 development group satisfies the requirement listed in first row of the D1 development group. The output device 10 D0002 of the B1 development group satisfies the requirements listed in second row of the D1 development group. The output device 10 D0003 of the B1 development group does not satisfy the requirement listed in third row of the D1 development group (print speed is insufficient). The output device 10 D0004 of the B1 development group also does not satisfy the requirement listed in third row of the D1 development group (print speed is insufficient).

Therefore, as illustrated in FIG. 25B, when the display control unit 12c of the client terminal 12 displays the list of the output devices 10 belonging to the transfer source, the specifications requested by the transfer destination for each output device 10 is displayed (that is, whether or not the requested specification is satisfied). In FIG. 25B, the display control unit 12c displays that D0001 and D0002 satisfy the requested specifications. Therefore, the user can select the output device 10 that satisfies the request of the transfer destination.

Note that the fact that the specifications are satisfied may be displayed by color, brightness, marks, etc., in addition to characters.

Figure 26:
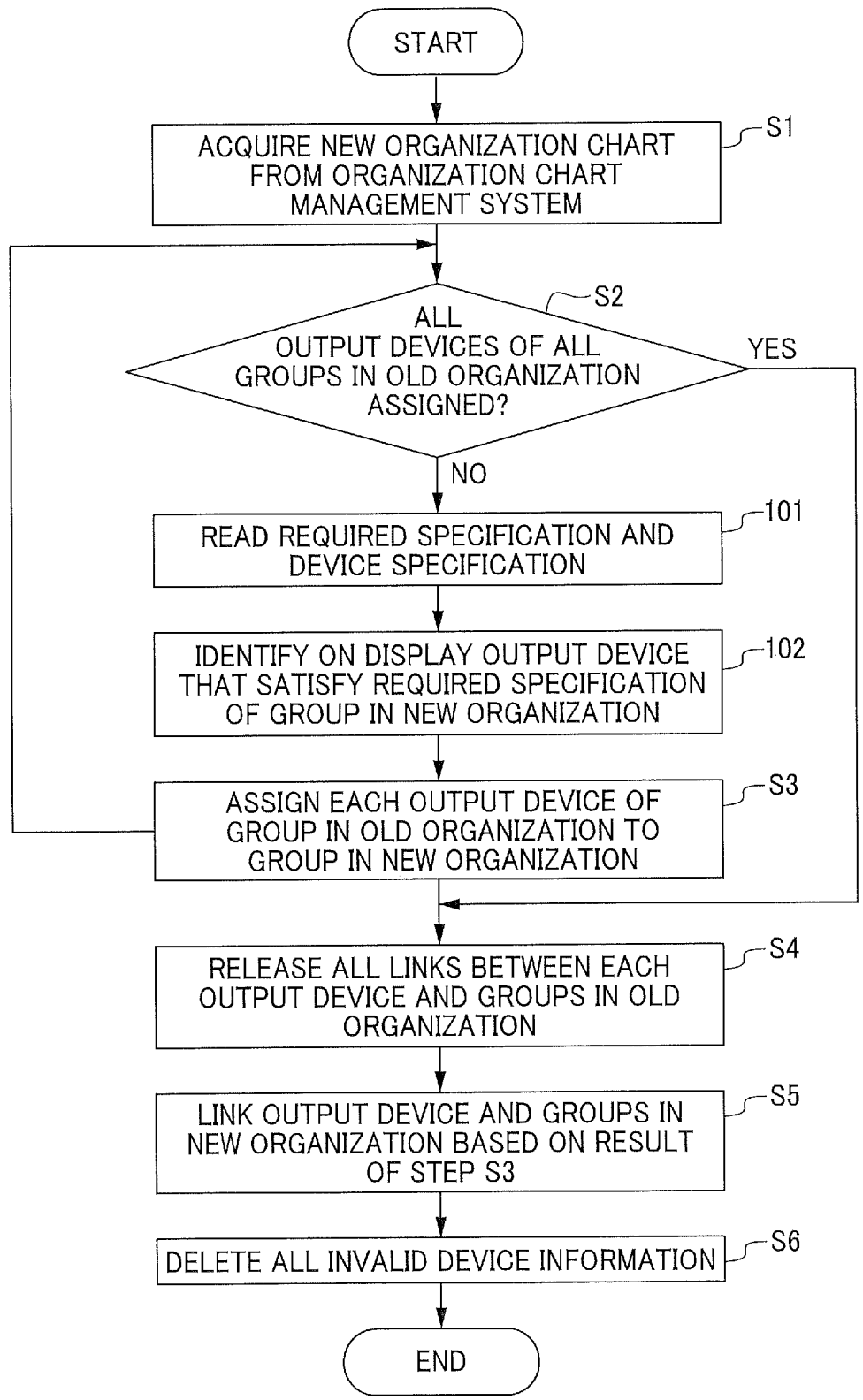
FIG. 26 is a flowchart illustrating an example of a process for assigning an output device to a group in the information processing system.

FIG. 26 is a flowchart illustrating an example of a process for assigning an output device 10 to a group in the information processing system 1. In the description of FIG. 26, differences from FIG. 16 is mainly described. The processes of steps S1 and S2 may be the same as in FIG. 16.

In step S101, the display control unit 12c reads from the screen data, the required specification information requested by the group in the new organization selected by the user and the device specification information of the output device 10 belonging to the old organization.

In step S102, the display control unit 12c determines and displays whether the required specification is satisfied or not satisfied, for the output device 10 that satisfies the required specification information requested by the group in the new organization, among the device specification information of the output device 10 belonging to the old organization. Subsequent processing may be the same as in FIG. 16.

According to the present embodiment, the client terminal 12 automatically determines whether or not the output device 10 of the old organization satisfies the specifications required by the new organization, and the convenience can be further improved.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

For example, the configuration examples of FIGS. 5 to 7 and the like illustrated in the above embodiments are divided according to the main functions in order to facilitate understanding of the processing of the information processing system 1. No limitation is intended by how the processes are divided or by the name of the processes. The processes implemented by the information processing system 1 can be divided to a larger number of processes depending on the contents of processes. Further, the processing unit may be divided so that one processing unit includes more processing.

Each function of the embodiments described above can be implemented by one or a plurality of processing circuitry. Processing circuit includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The apparatuses described in the examples are merely an illustration of one of several computing environments for implementing the embodiments disclosed herein.

In an embodiment, the service providing environment includes plural computing devices, such as a server cluster. The plurality of computing devices are configured to communicate with one another through any type of communication link, including a network, shared memory, etc., and perform the processes disclosed herein.

Further, each device in the service providing environment can be configured to share the disclosed processing steps, for example, FIG. 16, in various combinations. For example, a process executed by a given unit may be executed on any of the devices in the service providing environment. Further, each element of each device in the service providing environment may be integrated into one server or may be divided into a plurality of devices.

Note that the output device 10 is not limited to an image forming apparatus as long as the apparatus includes a communication function. The device 10 includes, for example, an output device such as a projector (PJ), an electronic whiteboard, a digital signage, a head up display (HUD) device, and an industrial machine, an imaging device, a sound collecting device, a medical device, a network home appliance, an automobile (connected car), a notebook PC, a mobile phone, a smartphone, a tablet terminal, a game console, a personal digital assistant (PDA), a digital camera, a wearable PC or a desktop PC.

What is claimed is:

1. A client terminal comprising:
   circuitry configured to:
      upon sending a request from the client terminal to one or more information processing apparatuses to assign one or more output devices to a new group, receive screen data from the one or more information processing apparatuses, each being configured to generate usage amount information of the one or more output devices belonging to a group, the group of each output device changing with an organizational change, said screen data including device data of the one or more output devices and a new organization chart;
      display on a display in a selectable manner based on the received screen data, one or more output devices each belonging to a particular group in an old organization, and one or more groups in a new organization that is included in the new organization chart as a candidate for transfer destination of the one or more output devices;
      receive selection of the one or more output devices belonging to the particular group in the old organization and selection of the one or more groups in the new organization;
      create association information that associates the selected output device with the selected group in the new organization; and
      transmit the association information to the one or more information processing apparatuses.

2. The client terminal of claim 1, wherein the circuitry is further configured to:
   in response to receiving the selected group in the new organization, display the one or more output devices belonging to the particular group in the old organization in a selective manner.

3. The client terminal of claim 2, wherein in response to receiving selection of at least one of the one or more output devices belonging to the group in the old organization each being displayed, the circuitry is further configured to:
   delete the selected output device from the one or more output devices belonging to the group in the old organization.

4. The client terminal of claim 2, wherein the screen data includes required specification information of the output device requested by the group in the old organization and device specification information of the output device belonging to the group in the old organization, and the circuitry is further configured to
   display on the display in the selectable manner, the one or more output devices belonging to the group in the old organization according to a result of comparison between the required specification information and the device specification information.

5. The client terminal of claim 4, wherein in response to receiving the selected group in the new organization, the circuitry is further configured to:
   determine at least one output device of the one or more output devices that satisfies the required specification information of the output device requested by the selected group in the new organization, based on the device specification information of the output device belonging to the selected group in the old organization; and
   display on the display, whether the output device belonging to the group in the old organization displayed in the selectable manner satisfies the required specification information.

6. The client terminal of claim 1, wherein the output device is an image forming apparatus.

7. An information processing system comprising:
   one or more information processing apparatuses each being configured to generate usage amount information of one or more output devices belonging to a group, the group of each output device changing with an organizational change, the information processing apparatus comprising:
   first circuitry configured to:
   transmit screen data, and
   a client terminal communicably connected to the one or more information processing apparatuses, the client terminal comprising:
   second circuitry configured to:
      upon sending a request from the client terminal to the one or more information processing apparatuses to assign the one or more output devices to a new group, receive the screen data from the one or more information processing apparatuses, said screen data including device data of the one or more output devices and a new organization chart;
      display on a display in a selectable manner, one or more output devices each belonging to a particular group in an old organization, and one or more groups in a new organization that is included in the new organization chart as a candidate for transfer destination of the one or more output devices based on the received screen data,
      receive selection of the one or more output devices belonging to the particular group in the old organization and selection of the one or more groups in the new organization, create association information associating the output device with the group in the new organization, create association information that associates the selected output device with the selected group in the new organization; and transmit the association information to the one or more information processing apparatuses.

8. A group change method executed by a client terminal, the method comprising:

upon sending a request from the client terminal to one or more information processing apparatuses to assign the one or more output devices to a new group, receiving screen data from the one or more information processing apparatuses, each being configured to generate usage information of one or more output devices belonging to a group, the group of each output device changing with an organizational change, said screen data including device data of the one or more output devices and a new organization chart;

displaying on a display in a selectable manner one or more output devices each belonging to a particular group in an old organization, and one or more groups in a new organization that is included in the new organization chart as a candidate for transfer destination of the one or more output devices, based on the received screen data, receiving selection of the one or more output devices belonging to the particular group in the old organization and selection of the one or more groups in the new organization;

creating association information associating the selected output device and the selected group in the new organization; and transmitting the association information to the one or more information processing apparatuses.

9. The client terminal of claim 1, wherein the one or more information processing apparatuses are configured to acquire the new organization chart from an organization chart management system and copy the new organization chart so as to create the screen data.

* * * * *